(12) United States Patent
Watry

(10) Patent No.: US 10,616,310 B2
(45) Date of Patent: Apr. 7, 2020

(54) INTERACTIVE FRIEND LINKED CLOUD-BASED TOY

(71) Applicant: Krissa Watry, Folly Beach, SC (US)

(72) Inventor: Krissa Watry, Folly Beach, SC (US)

(73) Assignee: Dynepic, Inc., Charleston, SC (US)

( * ) Notice: Subject to any disclaimer, the term of this patent is extended or adjusted under 35 U.S.C. 154(b) by 565 days.

(21) Appl. No.: 15/018,546

(22) Filed: Feb. 8, 2016

(65) Prior Publication Data

US 2016/0361663 A1     Dec. 15, 2016

Related U.S. Application Data

(63) Continuation-in-part of application No. 14/739,297, filed on Jun. 15, 2015, now Pat. No. 9,833,725.

(51) Int. Cl.
| A63F 13/77 | (2014.01) |
| H04L 29/08 | (2006.01) |
| A63H 3/00 | (2006.01) |
| G06F 9/445 | (2018.01) |
| A63H 3/36 | (2006.01) |

(52) U.S. Cl.
CPC ............ *H04L 67/10* (2013.01); *A63H 3/006* (2013.01); *A63H 3/36* (2013.01); *G06F 9/4451* (2013.01); *H04L 67/12* (2013.01); *H04L 67/30* (2013.01); *H04L 67/306* (2013.01); *A63H 2200/00* (2013.01)

(58) Field of Classification Search
None
See application file for complete search history.

(56) References Cited

U.S. PATENT DOCUMENTS

| 6,290,565 B1 | 9/2001 | Galyean |
| 6,368,177 B1 | 4/2002 | Gabai |
| 6,729,884 B1 * | 5/2004 | Kelton ................... G09B 23/28 434/236 |

(Continued)

FOREIGN PATENT DOCUMENTS

| CN | 20350112 | 4/2014 |
| WO | 2013192348 A1 | 12/2013 |
| WO | 2014060731 A2 | 4/2014 |

OTHER PUBLICATIONS

European Supplementary Search Report, European patent application No. 15809829.7. dated Jan. 15, 2018. The Hague, NL.

(Continued)

*Primary Examiner* — Tramar Y Harper
(74) *Attorney, Agent, or Firm* — Gregory Finch; Finch Paolino, LLC

(57) ABSTRACT

An interactive cloud-based toy for children having a communicator located in the housing of the toy. The communicator has electronic circuitry operatively coupled to a cloud database for transmitting and receiving data. The cloud database corroborates and aggregates data across toys, third party cloud services, and provides customized content to the communicator. The cloud database is operatively connected to the electronic circuitry and is capable of receiving commands therefrom and transmitting data thereto. The cloud database includes provision for authorization of the user and a sensor group. Parent permissions tables and child friends list in the cloud create boundaries of play for the interactive cloud-based toy.

16 Claims, 18 Drawing Sheets

(56) References Cited

U.S. PATENT DOCUMENTS

| | | |
|---|---|---|
| 6,773,344 B1 | 8/2004 | Gabai |
| 8,425,273 B2 | 4/2013 | Atsmon et al. |
| 8,647,202 B2 | 2/2014 | Crevin |
| 8,894,462 B2 | 11/2014 | Leyland |
| 2002/0049806 A1* | 4/2002 | Gatz .................. G06F 21/62 |
| | | 709/203 |
| 2002/0059153 A1 | 5/2002 | Dan |
| 2002/0103862 A1* | 8/2002 | Burr .................. H04L 63/083 |
| | | 709/204 |
| 2003/0059757 A1 | 3/2003 | Wood |
| 2004/0067713 A1 | 4/2004 | Fong |
| 2006/0234602 A1 | 10/2006 | Palmquist |
| 2006/0273909 A1 | 12/2006 | Heiman |
| 2007/0097832 A1 | 5/2007 | Koivisto |
| 2008/0005325 A1* | 1/2008 | Wynn .................. G06Q 10/107 |
| | | 709/225 |
| 2008/0014833 A1 | 1/2008 | Bozzone |
| 2008/0026666 A1* | 1/2008 | Ganz .................. G06Q 30/0222 |
| | | 446/175 |
| 2008/0160877 A1* | 7/2008 | Lipman .................. A63H 3/28 |
| | | 446/268 |
| 2008/0250471 A1* | 10/2008 | Cooley .................. G06F 21/6218 |
| | | 726/1 |
| 2009/0069084 A1* | 3/2009 | Reece .................. A63F 13/10 |
| | | 463/32 |
| 2010/0041304 A1 | 2/2010 | Eisenson |
| 2010/0285871 A1* | 11/2010 | Shah .................. G06F 21/552 |
| | | 463/29 |
| 2011/0028219 A1 | 2/2011 | Heatherly et al. |
| 2011/0053455 A1* | 3/2011 | Jang .................. A63H 3/28 |
| | | 446/397 |
| 2011/0143631 A1* | 6/2011 | Lipman .................. A63H 3/28 |
| | | 446/175 |
| 2012/0185254 A1* | 7/2012 | Biehler .................. H04L 67/125 |
| | | 704/270 |
| 2012/0190453 A1 | 7/2012 | Skaff |
| 2013/0022232 A1 | 1/2013 | Jacob |
| 2014/0038489 A1 | 2/2014 | Sharma et al. |
| 2014/0178847 A1 | 6/2014 | Akavia |
| 2014/0358986 A1* | 12/2014 | Min .................. H04L 67/38 |
| | | 709/202 |
| 2015/0031268 A1 | 1/2015 | Waites |
| 2015/0065258 A1* | 3/2015 | Meade .................. A63F 13/235 |
| | | 463/43 |
| 2015/0099419 A1* | 4/2015 | Kaiser .................. A63H 33/30 |
| | | 446/482 |
| 2015/0133025 A1 | 5/2015 | Ponomarev et al. |
| 2015/0140896 A1* | 5/2015 | Maiti .................. A63H 33/26 |
| | | 446/484 |
| 2015/0251102 A1 | 9/2015 | Kuo |
| 2015/0290548 A1* | 10/2015 | Meyers .................. A63H 3/28 |
| | | 446/397 |

OTHER PUBLICATIONS

Anonymous. "i-Phone—Wikipedia." 47 pages. Jun. 12, 2014. Accessed Jan. 10, 2018 at https://en.wikipedia.org/w/index.php?title=IPhone&oldid=612651044.

International search report, International application No. PCT/US2015/035829. dated Sep. 10, 2015. Korean Intellectual Property Office, Daejeon Metropolitan City, KR.

International search report, International application No. PCT/US2015/035814. dated Sep. 1, 2015. Korean Intellectual Property Office, Daejeon Metropolitan City, KR.

\* cited by examiner

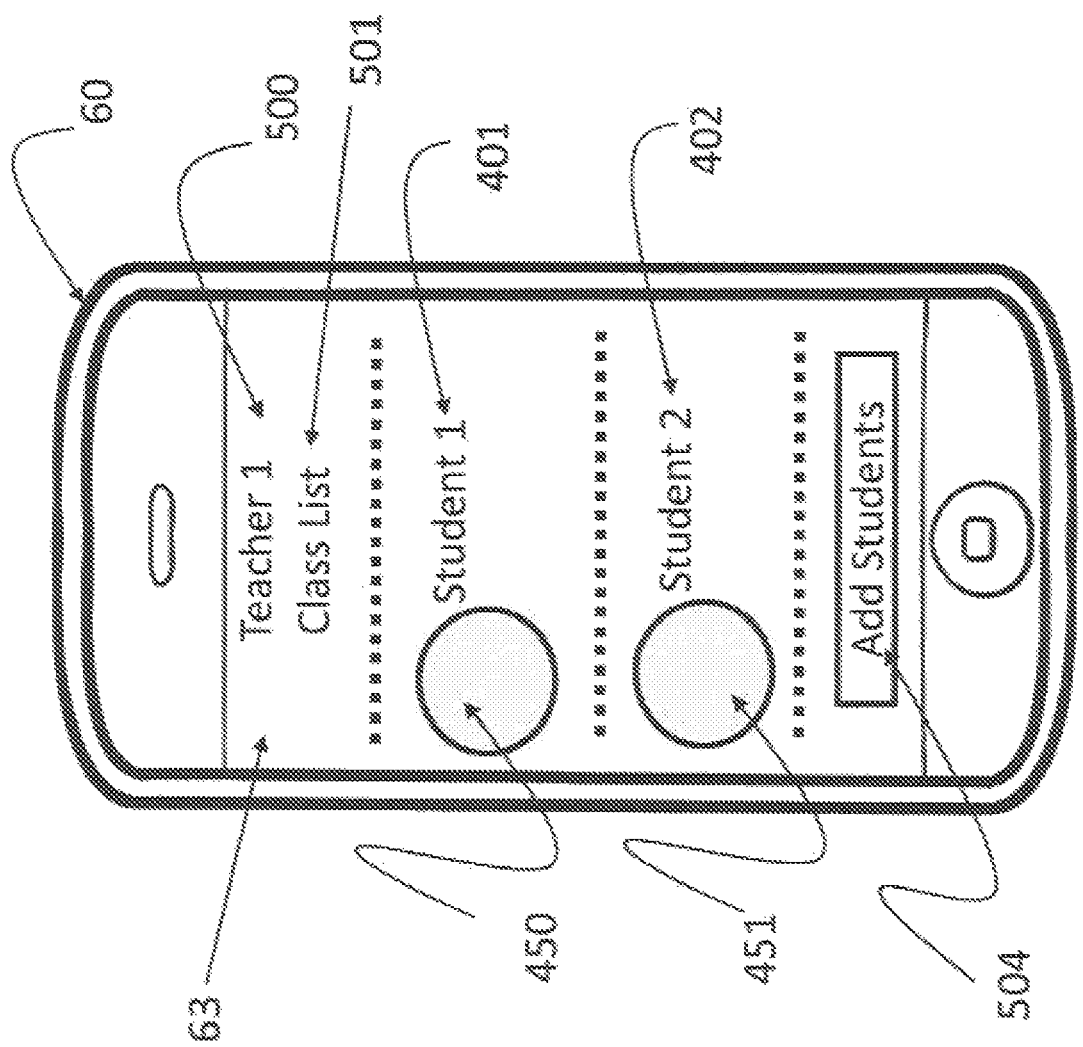

INTERACTIVE FRIEND LINKED CLOUD-BASED TOY

CROSS-REFERENCE TO RELATED APPLICATIONS

The present patent application is related to U.S. patent application Ser. No. 14/739,297 by Krissa Watry, filed on Jun. 15, 2015 and entitled "INTERACTIVE CLOUD-BASED TOY," assigned to the assignee of the present invention and hereby incorporated by reference.

FIELD

This invention relates to an electronic, interactive cloud-based toy system for children. More particularly, the present invention is to an interactive toy that can respond to physical stimuli and communicate with other toys, smart devices, and the Internet to update its behavior over time. The interactive toy in the present invention links with a secure cloud-based user profile where parents can create and manage child profiles, settings, and friends lists to allow for a social toy that can collaboratively interact with other toys as allowed by the child's parent or guardian.

BACKGROUND

While there have been toys that change personalities based upon how they were played with by the child, the toy's behavior was based on pre-loaded programs. In other toys, these programs could be changed slightly by a child's interaction on a smart device (such as a phone, tablet or computer) that was operatively connected to the toy. Other smart toys have been reported that use cloud databases to speak to a child using conversation engines in the cloud that learn about the child over time and prompt conversation based upon the child's responses. These smart toys can talk about seemingly relevant information for the child but they are not completely dynamic since they use pre-recorded audio files and are only as dynamic as the recorded files allow.

Utilizing dynamic content and algorithms to enable a toy to learn and grow with a child over time has been discussed. Commonly referred to as a smart toy, these toys typically link to an Internet hosted server called the cloud. This data and the algorithms in the cloud can then be used to alter the toy's behavior. Typically sensor information, responses, and analytics recorded from the child and their environment during play is stored such that it can be used to morph the toys behavior over time and thus, the toy seemingly learns about that child. For example, if a child enters that their name is "Sally" into a smart toys controlling application, the toy system can store that information locally on that smart device, the smart toy, or in the cloud and now the toy can recall the child's name.

It is well known that storing data associated about a child invokes a level of privacy protection, security, and permissions not typically required for adult Internet connected devices. Some have contemplated toys where a parent accomplishes setup and configuration tasks for a child, such as downloading data and selecting content to customize the play experience.

SUMMARY

It is the general object of the present invention to create an easy to use dynamic, polymorphic toy exhibiting pre-loaded, updated, connected or disconnected behaviors impacting the primary toy's (personality/features/game play), subsequent toys, and the child or children's course of play.

Intercommunication is the toy's cornerstone. This means that not only can smart devices (phones, tablets, computer and the like) interface with the toy, but the toy can communicate with other cloud connected toys from anywhere as long as there is wireless connection. The interactive cloud-based toy has a communicator located in the housing of the toy. The communicator has electronic circuitry operatively coupled to a cloud database for transmitting and receiving data through a Bluetooth connection with a smart device that then talks to the internet based cloud via a WiFi connection. Or in another embodiment, the communicator can talk direct to the cloud database via WiFi. The cloud database corroborates and aggregates data across toys, third party cloud services, and provides customized content based on a user profile to the communicator. The electronic circuitry provides power to a microprocessor having memory capability. The cloud database is operatively connected to the electronic circuitry and is capable of receiving commands therefrom and transmitting data thereto. The cloud database includes provision for authorization of the user and the associated sensor group. Other communication protocol and frequencies can be used, depending upon network availability and toy features allowing toys to communicate locally amongst the toys, to exchange data between the toys and the cloud service and variations thereof.

The interactive toy uses location of the toy (taken from the toy or a the connected smart device, or other connected device with location sensing), time, and/or interests of the child to generate custom content to enhance existing play patterns, personalize play content, and present an interactive and entertaining experience for children age birth to twelve where special privacy, parental permissions, and security must be maintained.

Embodiments of the present disclosure seek to create an easy to use and configure social toy system that is secure, privacy compliant that allows a kid's interactive toy(s) to link with only their parent approved friends interactive toy(s). Secure, social play based on parent-managed permissions configured in the toy cloud is one of the toy system's cornerstone features. More specifically, this means that a child's toy can communicate with their friends' toys so long as there is an application configuring them, a communication path between the toys, and they are authorized to connect with each other based on current or previously downloaded parent permission tables and friend's lists from the toy cloud.

To achieve the social play aspect of the interactive cloud toy system the following four main elements exist: a child's one or more interactive toy(s), a toy cloud, one or more friend's interactive toy(s), and a parent control application likely hosted on a smart device or computer. The child and their friend's smart toys have provisions to communicate with the Internet to the toy cloud, either directly or through an interface smart device such as a tablet or smart phone. When the child turns on the toy for the first time, the toy itself or it's downloaded smart device application, will force the child to login to their cloud toy account. If the child already has a cloud toy account previously setup by their parent, once their login credentials are authenticated by the toy cloud, a notification is sent immediately to their parent(s) to approve the new toy for use. The parent would use the toy cloud parent control application to consent to the personal information the toy and its application is collecting, storing, and sharing. If the smart toy is parent approved in the parent control application, the child would receive a notification that approval to use the toy has been granted by their parent and they can now continue setup of their smart toy. During smart toy setup, a toy's unique device ID is registered to that child's profile and the device ID is linked in the toy cloud to that child's user profile.

If the child didn't already have an account when they first began the toy registration process, they would not be allowed to proceed to the full features of the app without a toy cloud account. The child would be prompted to provide their age. If their age was under a threshold, usually around 13 years old, they would input a parent's email, phone, or other allowed contact information for their parent. This would notify their parents to download the parent control application where they would have their identity verified with a number of means, one method may be facial recognition, a government issued identification, or a credit card transaction to name a few. Once verified, they would be allowed to create a toy cloud verified parent user profile and then subsequently create their children's user profiles. The child accounts would sit below the parent account such that the parent could manage, monitor, and alter the child accounts. With child accounts created, the parent would be able to review the personal information gathered, stored, and shared by the smart toy, app, or game on their child. After review, they would be able to provide verified consent for the privacy information. The parent control application would allow for the control, monitor, and management of all their children's interactive toys, apps, or games associated with the toy cloud. Once the smart toy is approved by the parent, the child could resume setup of the toy using the login credentials specific to that child that the parent created. When the child's toy cloud profile is successfully authenticated with the toy cloud and the toy is successfully registered with the child's account, the smart toy can now be friend-linked. The smart toy would request the friend's list and parent permissions from the toy cloud for that user, thus allowing the smart toy to only connect with the child's friends who are parent approved and not muted in the parent control application.

If a friend is not on the list, a child can search for them and request they become friends. Before the friend request is submitted for approval, the request is promoted to their parent for their parent to approve. If approved, the request is then sent to the friend's parent for them to approve. If both parent's consent, the friend is added to the parent-approved friend list. At any time a parent can use the parent control application to temporarily mute a friend on the friend list, and it would be like a virtual timeout. That friend would be temporarily muted on the friend list and any associated app, game, or smart toy would not be able to link to that friend's associated apps, games, or smart toys. Parents can restore the communication path and social link but unmuting. Parents can also, permanently delete a friend.

Just like muting friends, parents can also mute the smart toy or its apps and games. This would make some or all features of the smart toy not work until the parent un-mutes it. Parents can also revoke consent for the use of the smart toy or any of its games and apps at any time. Revoking consent will permanently delete that smart toy or its individual game or app from the parent control application and the child will no longer be able to use the smart functions enabled by the toy cloud for the smart toy, game, or app. A message is also sent to the manufacturer of the toy, game, or app to ensure they delete any personal information they have stored on the child since privacy consent was revoked and they are no longer allowed to keep personally identifiable information for that specific toy, app, or game.

A key part of this invention is the ability of the parent to control the toy's and personalized settings on the toy cloud for their children and have it applied to the third party apps and toys on the platform of the toy cloud. Friends lists, child profiles, parental permissions, etc. would be accessed by toy companies and app developers via a secure API and software development kits having the parent manage a single login and parent permission database for their child that can control and manage multiple types of toys and associated apps.

There could be many variants and different play patterns for social smart toys imagined by someone skilled in the art. One variant is a friend-linked mood toy system which included a product line of characters, where each character includes the necessary circuitry to communicate with the toy cloud and be linked to a child or one or more of their friends to display their current mood. A child likely starts with a pack of three toys. One to assign to themselves, one to assign to their friend, and one to give their friend so they can play along. The child would login to the toy cloud, assuming their parent's had approved the toy in the parent control application already, the child would then be able to register the first toy's device ID with the app and link this device to their mood state. With the initial smart toy linked to their moods in the control app, when a child updates their mood to mad for example in the app, it would change the color of the light in the toy to red. If the child was feeling jealous, the toy would receive a command to change the color to green and so on. The child would then be able to register the other toy and link it in the toy app to one of their parent-approved friends. The third toy that was given to their friend, allows them to register with the toy cloud and if their parent's approved the use of the toy in the parent control app, they too could link the smart toy they received from their friend to the smart toy app and use it to update their mood such that if they said they were bored, it would change their smart toy at their house to the color blue and at their friend's house, the smart toy linked to them, would also be blue. If the child wanted to see what mood their friend was feeling, they could purchase another smart toy and link it to that friend. The idea with this embodiment of the smart toy, is that only one smart toy could be linked to a single friend. Multiple smart toys could be purchased and using the friends list, each one could be linked to a different friend. While a child could see the mood and send messages to the parent-approved friends in the smart toy control app hosted on a smart device like a tablet, computer, or smart phone, the toys themselves when connected to each other locally or through the Internet could relay a lighted display of their mood so when a kid wakes up, they could see that Suzy was feeling sad because her linked smart toy was glowing white and the child could open the smart toy control app to send her a message and inquire about why she was sad.

The smart toys could be customized digitally and physically to reflect the unique personalities of the child and their friends and be a way that the child could remember which toy was linked to which friend. Outfits, hair and eyes could be affixed and the smart toys could be customized with clothing or even be purchased with a distinct molded element to remind the child of themselves or their friend they link to it.

The toy could communicate directly with the Internet and receive light command updates (mood changes) via WiFi, cell, or the like. Or the toy could host a Bluetooth radio or beacon like device and be linked to a smart device with an internet connection that can route data to the local toy(s) and send data to the Internet for routing to the friend linked smart toys to update their mood states. Additionally, each toy could have a local table of all the other toy device IDs it is allowed to be friend-linked with. That local database may be stored on the toy and updated as Internet connections exist to allow it to receive updated light command from another toy with a link to the Internet or even just be able to know when a friend's toy is near.

A database of the child, their associated device ID, and their parent approved friends list and permission tables would exist on the toy cloud. Additionally, in the case of a friend-linked mood toy system, mood states of the toy may exist on the toy cloud or in a toy manufacturer's server that is allowed to authenticate with the toy cloud to access the child profile information.

Control of a toy cloud parent profile would occur through the parent control application. Parent profiles may be linked such that multiple "verified" guardians could manage the same child profiles. Additionally, verified third parties like teachers or physicians, could be linked with a parent/child profile on the toy cloud and allowed to access certain elements of the child profiles, as approved by the parent. Many interactive toys have found there way to the classroom to be an educational element. Allowing a parent/child toy cloud profile to be linked with parent permission to a school teacher allows a teacher to provide consent for an underage student to use a smart toy in the classroom setting but for the parent to monitor the smart toy usage and social interaction on their own time from the parent control app giving them insight to the activities and their child's performance with the smart toy in the classroom. Additionally, this keeps parent's in the loop with the smart toy, apps, and games the teachers are providing consent on their behalf. The parent's could ultimately trump the Teacher's consent if they wanted to by revoking consent for that particular smart toy.

There could also be multiple types of friends list. A temporary friends list could be created on the toy cloud by a verified teacher for all of the kids in a classroom and the verified teacher on behalf of the parent, could consent to privacy data collected, stored, and shared, as well as add all the kids in the classroom to a temporary friends list for the length of that class. Friends from the classroom could be promoted to full friends with parental approval; otherwise, interaction would be revoked at the end of the semester or when the teacher closes the activity. The parent could view and ultimately trump the teacher by revoking the consent the teacher granted on their behalf for the use of the friend-linked smart toy system.

An object of the present invention is an interactive toy system comprising at least one child communicator in the form of a toy having electronic circuitry located therein, the electronic circuitry comprising a microprocessor having memory capability and being operably connected to a wireless transmitter/receiver configured to receive commands therefrom and transmit data thereto; a cloud server operable to corroborate and aggregate data including one or more authorization provisions for a parent user profile and at least one child user profile, the cloud server being operably connected to the at least one communicator via an Internet connection; at least one friend communicator in the form of a toy having electronic circuitry located therein, the electronic circuitry comprising a microprocessor having memory capability and being operably connected to a wireless transmitter/receiver configured to receive commands therefrom and transmit data thereto, the at least one friend communicator being communicably connected to the at least one child communicator via the cloud server; and, a parent control application executing on a smart device and being operably connected to the cloud server via an internet connection, the parent control application having one or more authorization provisions operable to manage permissions for the least one child communicator.

Another object of the present invention is secure social play system comprising a plurality of child communicators each in the form of a toy having electronic circuitry located therein, the electronic circuitry comprising a microprocessor having memory capability and being operably connected to a wireless transmitter/receiver configured to receive commands therefrom and transmit data thereto; a cloud server operable to corroborate and aggregate data including one or more authorization provisions for a parent user profile and at least one child user profile, the cloud server being operably connected to the at least one communicator via an Internet connection; a child play application executing on a child smart device and being operably connected to the cloud server via an Internet connection, the child play application having one or more authorization protocols operable to connect the at least one child user profile to one or more linked communicators; and, a parent control application executing on a smart device and being operably connected to the cloud server via an Internet connection, the parent control application having one or more authorization provisions operable to unlock application permissions for the plurality of child communicators, and manage and display a parent user profile and a child user profile.

Yet another object of the present invention is an interactive toy system comprising at least one child communicator in the form of a toy having electronic circuitry located therein, the electronic circuitry comprising a microprocessor having memory capability and being operably connected to a wireless transmitter/receiver configured to receive commands therefrom and transmit data thereto; a cloud server operable to corroborate and aggregate data including one or more authorization provisions for a parent user profile and at least one child user profile, the cloud server being operably connected to the at least one communicator via an Internet connection; at least one friend communicator having electronic circuitry located therein, the electronic circuitry comprising a microprocessor having memory capability and being operably connected to a wireless transmitter/receiver configured to receive commands therefrom and transmit data thereto, the at least one friend communicator being communicably connected to the at least one child toy via the cloud server; a parent control application executing on a smart device and being operably connected to the cloud server via an internet connection, the parent control application having one or more authorization provisions operable to manage permissions for at least one child communicator, and manage and display a parent user profile and at least one child user profile; and, a child play application executing on a child smart device and being operably connected to the cloud server via an Internet connection, the child play application having one or more authorization protocols operable to connect the at least one child user profile to one or more linked communicators.

Other objects features and advantages of the invention will be apparent to those skilled in the art from the following detailed description taken in conjunction with the drawings.

BRIEF DESCRIPTION OF THE DRAWINGS

Having described the invention in general terms, reference will now be made to the accompanying drawings, which are not necessarily drawn to scale, wherein:

FIG. 18 illustrates an embodiment of a management app screen for a temporary friends list of child profiles, in this case a teacher's class list.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Figure 1:
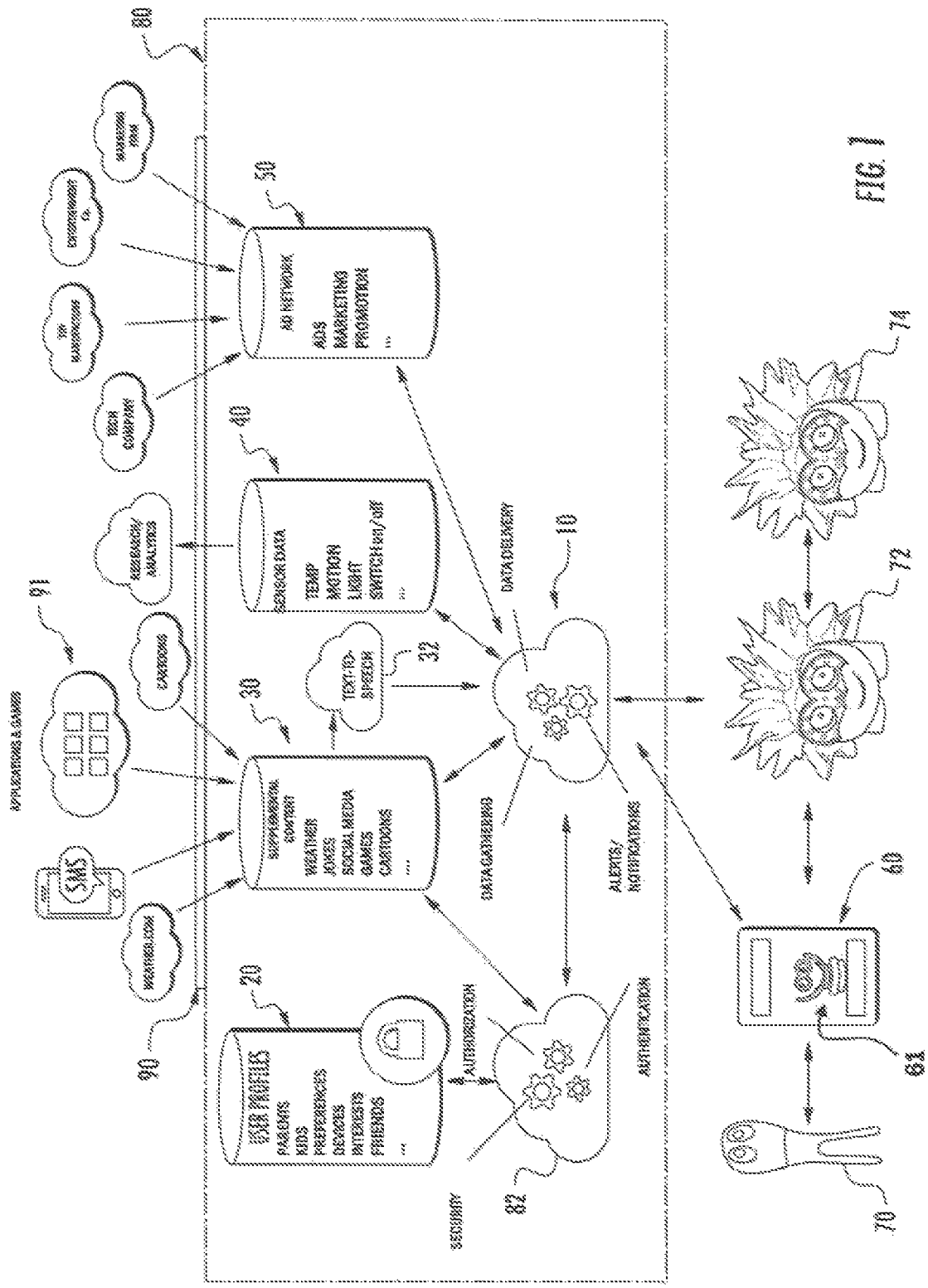
FIG. 1 is a diagram illustrating interaction of a communicator with a cloud database according to the present invention.

As shown in FIG. 1 the toy having a communicator 70 located therein connects to the cloud database 10 which corroborates and aggregates data across toys, smart devices, third party cloud services, and provides customized content to personalize the toy, or offer additional content to the child based on the child's user profile. For example, cloud database 10 utilizes location based content in order to correctly identify states like the weather and time of the associated communicator. Cloud database 10 addresses the children's interests based on the play patterns of the child with one or more communicators, information entered into a smart device application, or data queried from user profiles 20, the smart device itself (phones, tablets, computer and the like) 60, or other applicable user description entities in the cloud. The associated databases in the cloud 80 then uses this interest data to generate content applicable to the interests of the user and transmits that relevant content to one or more of the communicators 70, 72 and 74. These communicators may take the form of a toy such as the ones shown in FIG. 1 and FIG. 8 or a more conventional toy, such as a truck or a teddy bear, are used to house the communicator. For example, if the child is interested in cars, communicator 70 may push a relevant car joke from supplemental content portion 30 of the cloud database 10 and transmit it in speech form to the communicator 70 for the child. A timer hosted on the communicator, synched periodically with the smart device's 60 or cloud database's 10 time is also built into the communicator 70 to allow for a stopwatch, timer, and alarm function. The communicator 70 can use interest, location, and/or time based interactions in order to further entertain and inform the child.

Additionally, the cloud 80 has a third party application layer 90 that allows for outside individuals to write applications 91 that can connect with the cloud 80 and ultimately change the communicator 70 behavior. An application layer is an abstraction layer that specifies the shared protocols and interface methods used by hosts in a communication network. This ability allows for new communicator games, cloud database content to enable new behavior of the communicators, or create new communicator to communicator interaction that could reside for all communicators attached to a user profile 20 or just pre-selected communicators. For example, a third party application may be written to get communicator 70 to interact in a new way with communicator 72 and/or communicator 74 using the on-board sensors and effectors in a new way. Perhaps shaking communicator 70 would cause communicator 72 to laugh and communicator 74 to wag its tail. The third party application 91 can cause a smart device 60 to interact in a new way with communicator 72 and communicator 74. The smart device 60 includes a connection to the internet, and may include a screen display. It is envisioned that a child could select a cartoon to play on the smart device 60. The smart device 60 is linked to the cloud 80 and can alter the behavior of the communicator 72 associated with the user profile 20 such that if the cartoon character's laser fires in the cartoon, the laser of the communicator 72 will sound and flash too.

The user profile 20 stores the personally identifiable information for a user. A master profile is created by an adult guardian and then the guardian creates child profiles under the master profile. The adult having access to the master profile can view and control the child profiles created under it. They may use a smart device 60 to set this up. A master profile links master or child profiles with other master or child profiles to allow for secure friend linking and association within the user profile 20. In order for applications or toys to access data from within a profile, the user must be authenticated 82. The user profile 20 will continually update with data on a child, their development level, connected toys, connected devices, interests, skills, friends, and location, just to name a few. It is paramount that this information is secure and only accessed by the authorized applications, entities, and personnel. The authentication 82 will ensure only authorized users have access to the different data sets stored in the user profile 20.

Having a user profile 20 that stores data about a child and who their authorized friends and parents are, allows relevant and interest based content to be collected, derived, or stored and then used to influence, change, or customize a communicator's 70 response and behavior. Communicator 70 and smart device 60 have different sensors 160 (see FIG. 4), such as microphones, accelerometers, gyroscopes, magnetometer, geo-location, tilt, sound, temperature, lights, pressure, buttons, and the like. The communicators may also have different effectors 150 (see FIG. 4) like rotary or linear motors. The states of these sensors and effectors can be recorded in sensor data 40. By collecting the sensor state information over time, the data can then be accessible for developers to use in creating new applications 91 that use that sensor data. For example, a game developer may develop a new game for the smart device 60 that uses the sensor data 40 of a communicator 70 with a temperature sensor. When that communicator 70 is put in a cold environment like the freezer, the temperature data is transmitted directly to the smart device 60 or through the internet to the smart device 60 hosting the game 61 and this environment changes the game 61 to an artic environment, unlocking the artic level. If the communicator 70 is put in the sun, the game 61 then moves it to a tropical environment.

Another portion of the cloud 80 is supplemental content 30 that receives data such weather, jokes, fun facts, social media, and the like. The data from supplemental content 30 may be sent to cloud database 10. The sensor data 40 can be utilized by others for research, to develop new learning algorithms about the child's development, or it could even be used for analytics for toy manufacturers and parents interested in how a child is using the associated toy with a communicator 72. This data can be used to inform new features for existing or follow-on toy lines. Using a motion sensor on the communicator 72, one may know when it is being played with. The motion data, stored in sensor data 40, could then be used to generate and analytics report to determine the communicator 70 to communicator 72 interaction time or communicator 72 total use time.

As analytics and data about children, their parents, and their friend network is gathered this data becomes highly valuable to toy manufacturers, content creators, and game developers to perform targeted advertising. How a toy is played with, what time of day it is, where the child is when playing, e.g., at soccer practice, at school, in the back of the car or elsewhere, and for how long during each play session can inform future providers of features for the communicator 70, games for play with the communicator 70 or cloud 80 content. If a child owns two communicators that are, for example, trucks (information stored in the user profile 20), and there is a new truck movie coming out to the theatres, this relevant content may be pushed from the ad network 50 to the master profile or if allowed by the master profile, the content may also be pushed to one or more child profiles. Who the ads are pushed to is determined based on cloud 80 information on the interests of the child. If the data can be pushed directly to the child, the child's associated communicator 70 (e.g., a truck) may even prompt to the child—"Do you have tickets to the new truck movie? Let me tell you how awesome the movie is going to be! Vroom vroom!"

The communicator 70 will be able to wirelessly upgrade as well, so new content that is designed after the original launch will be available to all who purchased the toy either by download or through purchase. This allows for product growth and allows for a faster release date because it can always be built upon.

Figure 2:
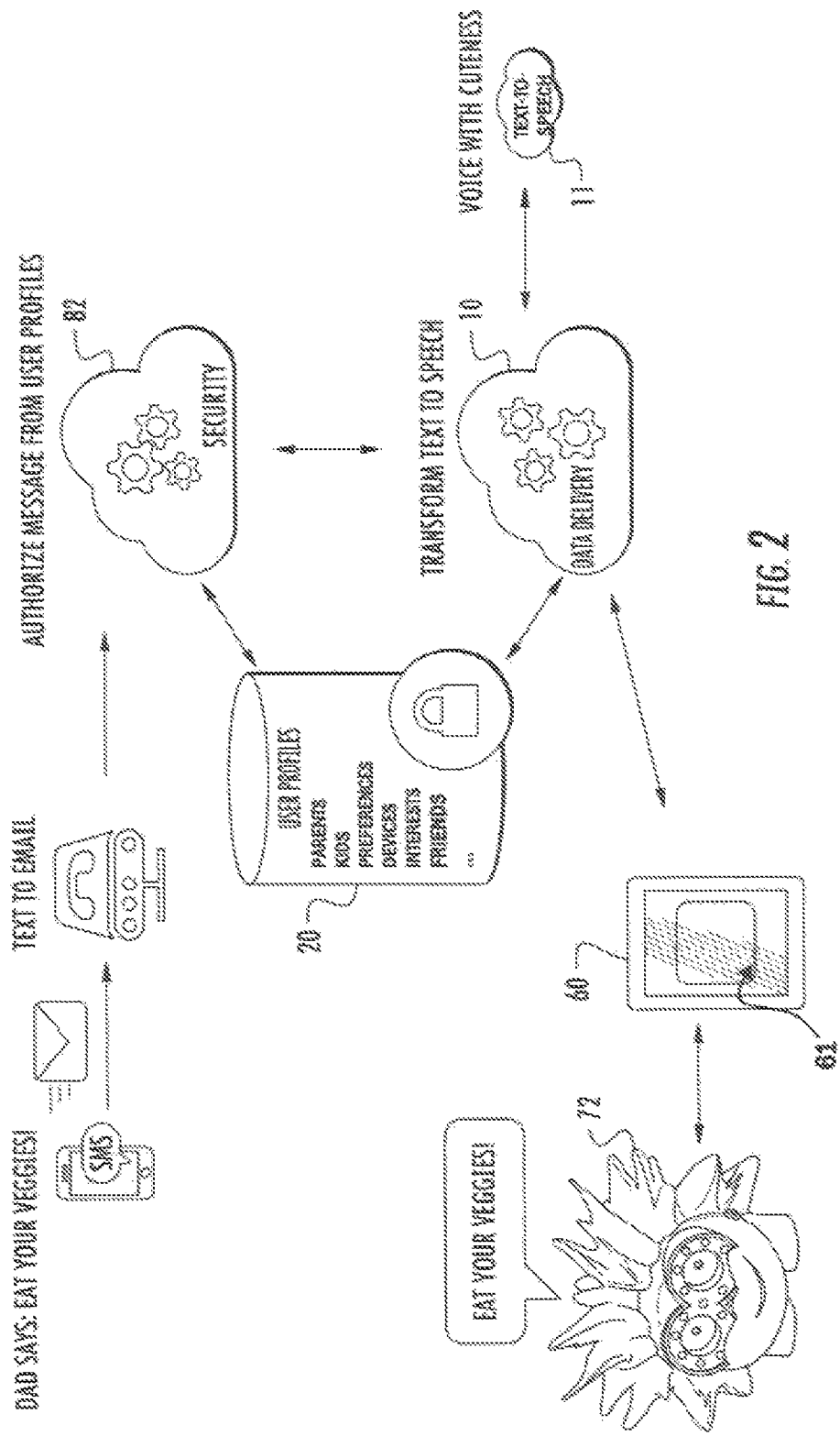
FIG. 2 is illustrates an example of one of the uses of the electronic interactive cloud-based toy of the present invention showing a path of text-to-speech communications.

A key feature of this invention is text-to-speech technology. To show how this feature works an example path for text-to-speech communications is shown in FIG. 2. A person will be able to send a message to a specific address in a variety of text formats and the data delivery 10 will relay the message via speech played through the speakers 78 (shown in FIG. 8) of communicator 72 or the smart device 60. The message can be sent through SMS text messaging or email, audio converted to text, and through content input or derived from the web-based application or the content generation algorithms through the security authentication 82 and the user profile 20 to the data delivery 10 and then transmits to the communicator 72 for play on demand.

The user or content based responses can be customized using a database of custom voices and languages hosted in the text-to-speech engine 11 of cloud 80. The text-to-speech engine allows for audio files to be generated in different voices with different genders, cartoon characters, and specific filters like pitch, bullhorn, echo, and the like. Alternatively, content to speech is a separate take on text-to-speech where content is generated not from the user or the user's family/friends via a message but from the cloud databased offerings and converted to audio in the text-to-speech engine 11. For example, if the child logs into the application 61 and types in their name as "Johnny," the cloud database 10 will generate a response that allows the associated communicator 70 or even just the character on the application 61 itself, to say "Hi Johnny." Based on the interests logged by the child over time and stored in the user profile 20, the cloud database 10 routes updates like sport scores, weather announcements, franchise/brand updates, and for example, "The new super hero movie is out! Let's go watch it!" The application 61 that will interface with the communicator 72 will have a set of parental control layers (authentication 82) for determining obvious privacy purposes. The parent will be able to set which devices will be able to communicate with the communicator 72 such as approved email addresses, phone numbers, and content that will be connecting to the communicator 72, as well as if marketing data from ad network 50 is allowed.

Figure 3:
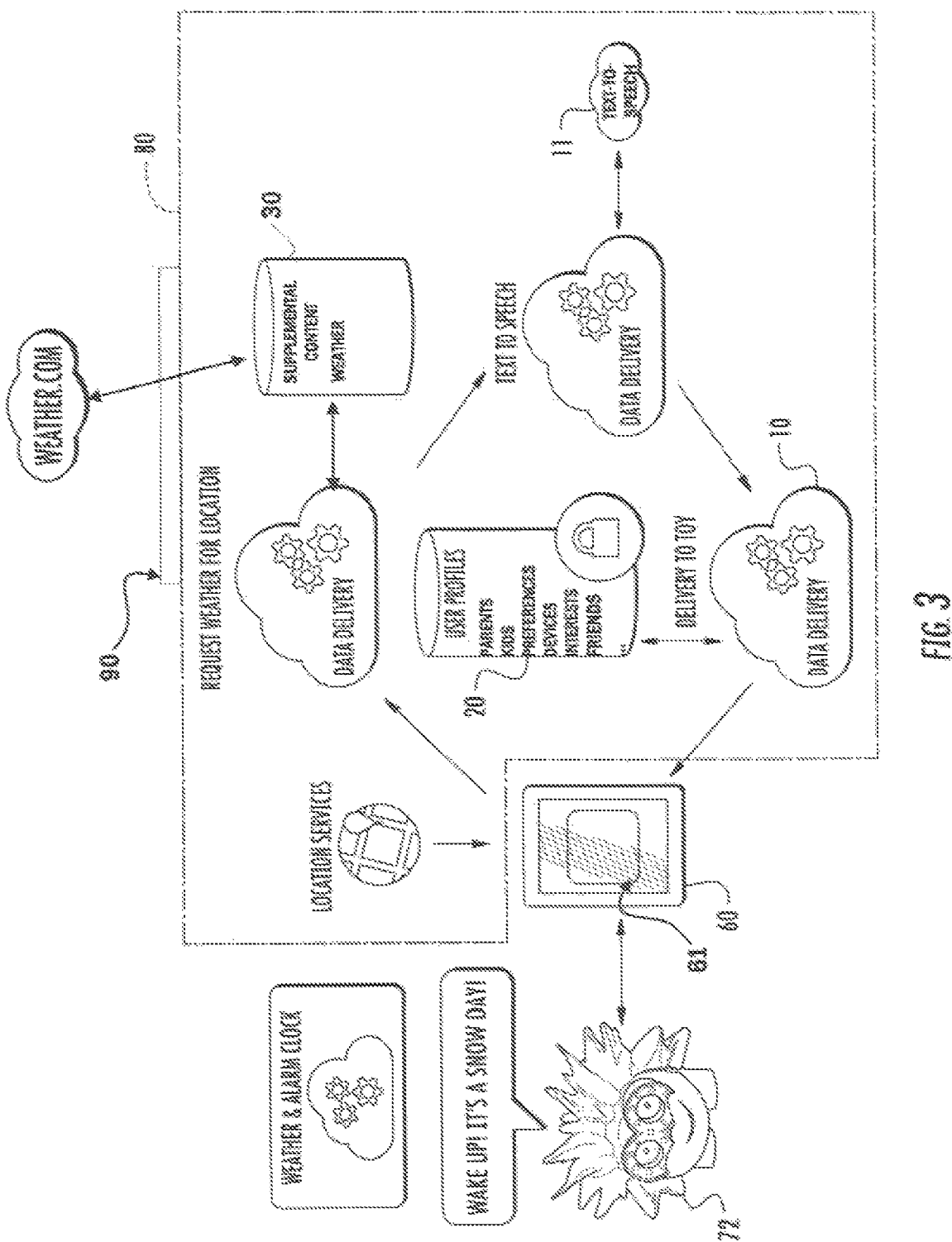
FIG. 3 is a diagram showing the programming of the electronic interactive cloud-based toy of the present invention to provide weather notices.

Another example of the usefulness of this invention is shown in FIG. 3, wherein the communicator 72 is programmed to generate customized responses based on the current weather. The cloud 80 may be programmed to communicate the weather to a user and provide customized alarms based on the weather. For example, a child may set an alarm for their communicator 72 to wake them at 6:00 am if it is a snow day and if not a snow day, to wake them at 7:00 am. They can customize the communicator for a snow day to wake them with yellow LED lights, and say "Wake up! It's a Snow Day!" The weather data is queried for the location of the communicator 72 which is pulled from the communicator 72 itself or the smart device 60 sensor. The weather data for that location is queried from cloud resources such as weather.com through the application layer 90. Based on the programs 61 on the smart device 60 or stored in the cloud 80, the communicator 72 can relay the weather by converting the specified weather statements ("Wake up! It's a Snow Day!") in the text-to-speech engine 11. The text-to-speech engine 11 will then deliver the audio and command data to data delivery 10 where it is routed to smart device 60 and then to communicator 72. If the communicator 72 had WiFi, the smart device 60 would not be needed and the communicator could receive the weather alarm statements directly.

There may be circumstances where the internet is not available. In the absence of an internet connection, the communicator 72 and/or the smart device 60 will have built-in programmed games. The child will be able to play classic games such as "Simon says" through the application 61 on the smart device 60 using the communicator 72 as input or output of the game. The games run through the application will connect to the communicator 72 via a Bluetooth device. There will also be games programmed into the communicator 72 that can be played without the application 61, so no wireless connection or smart device 60 with application 61 will be needed. An example would be an "ask" function, in which the child can ask a question and either by voice recognition or shaking of the communicator 72, the communicator 72 will provide an answer with pre-programmed content. The pre-programmed content can be updated when in range with the smart device 60 and/or connection to the cloud 80 so the next time the communicator 72 is offline, it has new content to pull from. The previously mentioned ability to download new content will also allow the communicator 72 to add new programmed games that, once downloaded, can be played without an internet connection, either using the application 61 or just through the toy.

Figure 4:
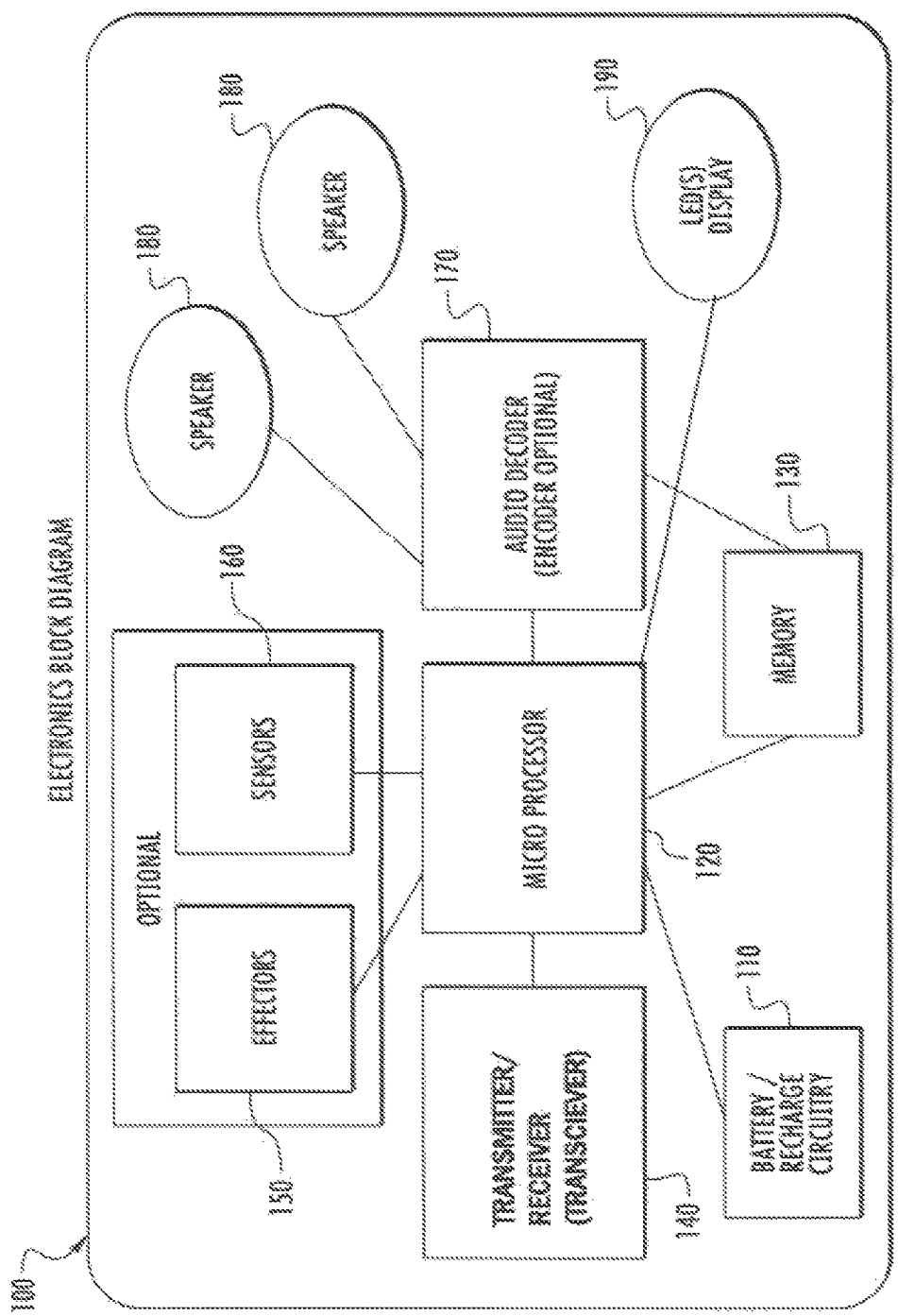
FIG. 4 is a block diagram showing the electronic circuitry of the present invention.

The electronic circuitry 100 of the communicator 72 used in the present invention is shown in FIG. 4. The electronic circuitry 100 includes a power supply. In the example shown in FIG. 4 the power supply 110 may be a battery with recharge circuitry. The power supply 110 powers a microprocessor 120 connected to a memory unit 130. The microprocessor 120 is also connected to a transmitter/receiver 140 also known as a transceiver. The transceiver 140 may be Bluetooth or instead of using a Bluetooth device a WiFi connection may be used, if desired. The electronic circuitry optionally but usually contains effectors 150 and sensors 160. The sensors 160 are a selectively populated group of sensors used to gather and monitor data and send the data to microprocessor 120. An example of a sensor from this group is a temperature sensor. Other sensors might include, sound, light, motion, and the like. The electronic circuitry also may include an audio decoder 170 having one or more speakers 180 connected thereto. Another option is to connect an LED display to the microprocessor 120.

Figure 5:
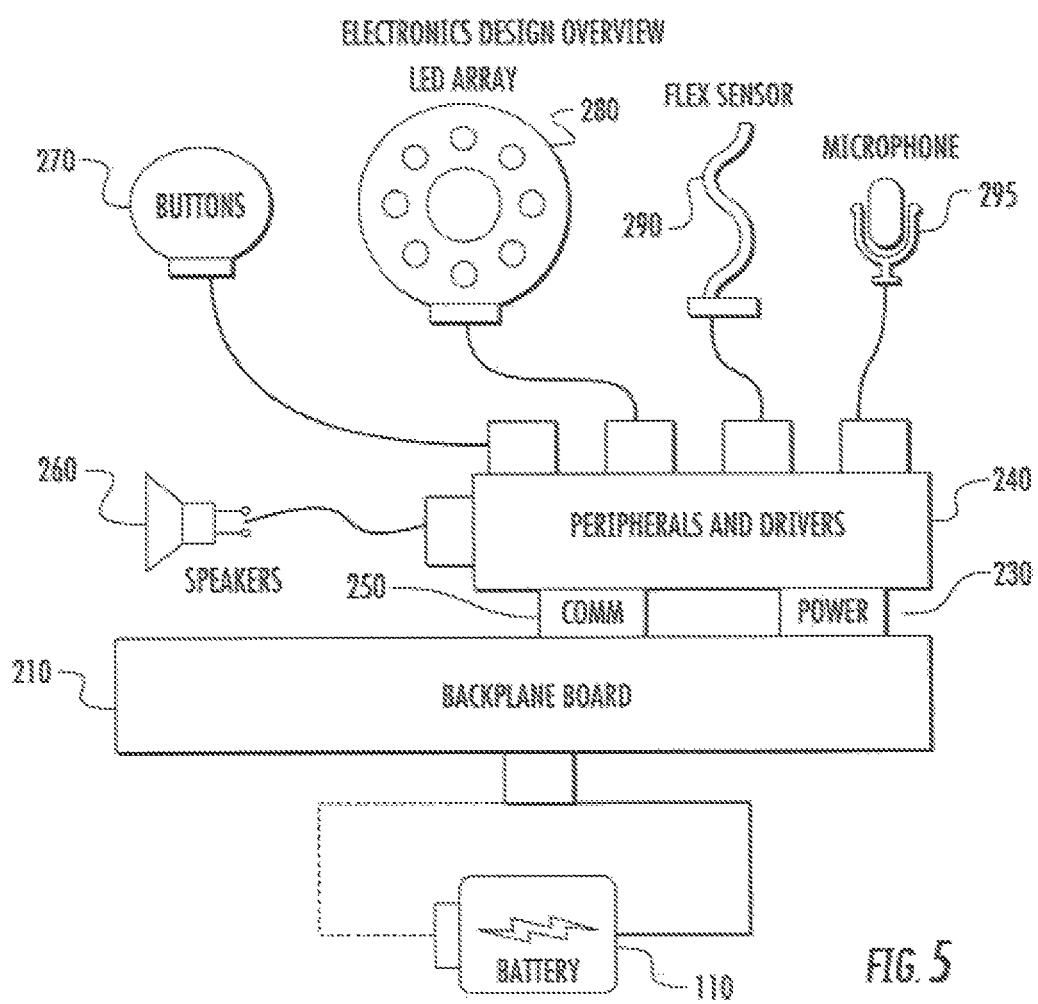
FIG. 5 is an overview of the electronic circuitry design for the communicators of the present invention.

FIG. 5 is a more detailed embodiment of the electronic circuitry 100. Battery 110 is connected to backplane board 210 or such other support as is well known in the art, such as a mother board or the like. A power connection 230 connects power from board 210 to peripheral and driver board 240 holding the peripherals and drivers. A communications connection 250 serves to communicate data from the peripherals and drives to the board 210. The peripherals and drives may include, for example, speakers 260, buttons 270, an LED array 280, a flex sensor 290 and a microphone 295.

Figure 6:
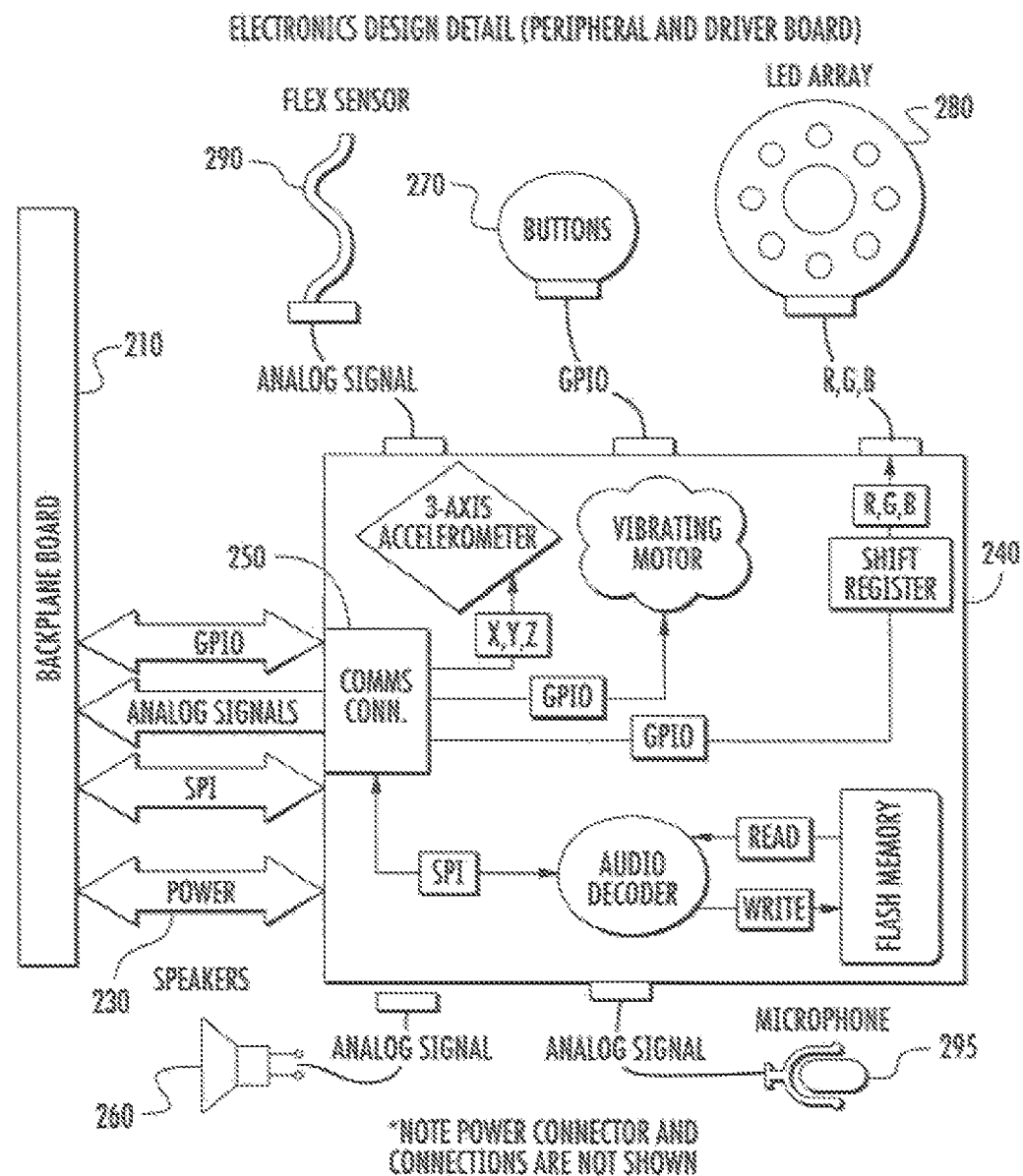
FIG. 6 is embodiment of the electronic circuitry of the peripheral and driver board shown in FIG. 5.

The electronic circuitry of the peripheral and driver board 240 is shown in FIG. 6, The backplane board 210 is connected to board 240 with connections that provide a power 230 and data connection 250. The board 240 includes all the board mounted sensors (flex, accelerometer, and others) and effectors (vibration motor and others), either surface mounted direct to the board or harnessed off of it. The peripherals and drives may include, for example, speakers 260, one or more buttons 270, an LED array 280, a flex sensor 290 and a microphone 295. The microphone 295 is connected to an audio decoder with read/write capability available from a flash memory.

Figure 7:
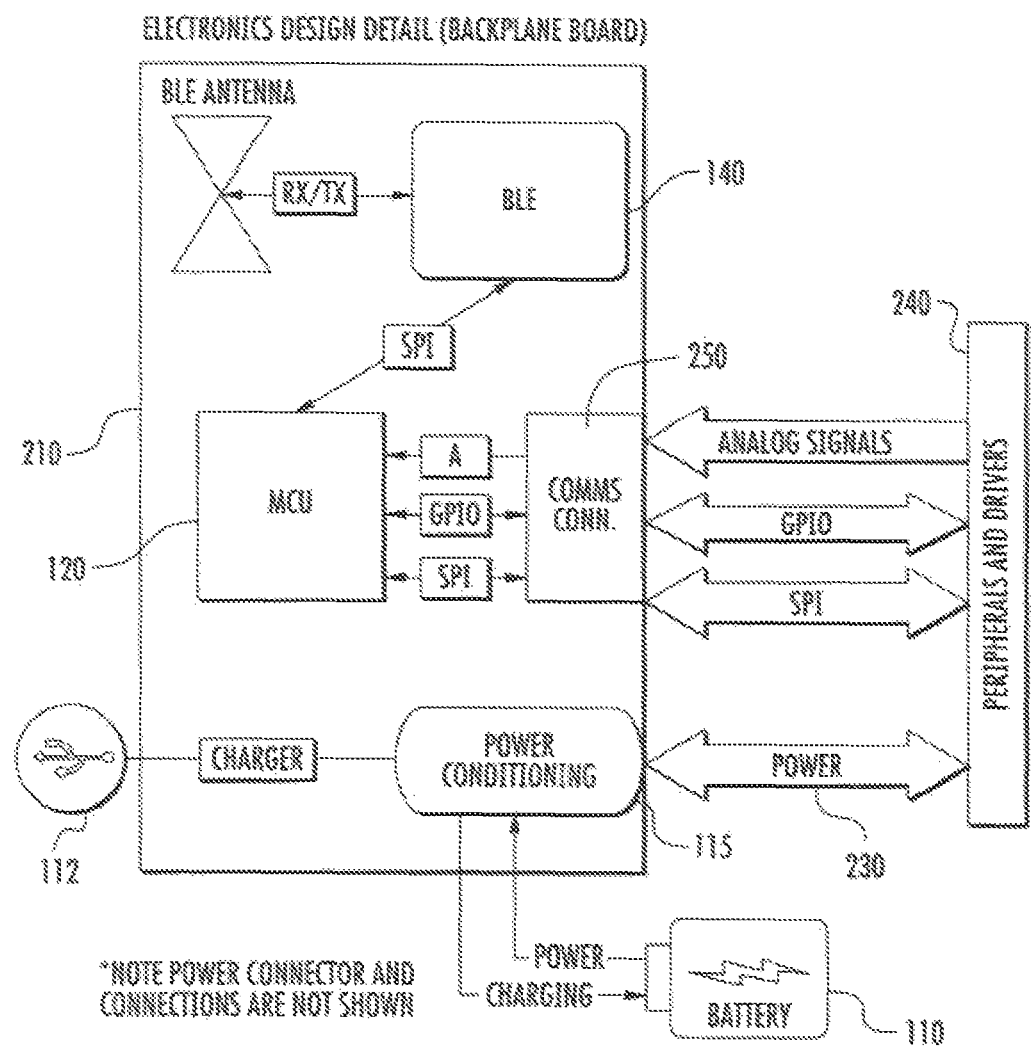
FIG. 7 is an embodiment of the electronic circuitry of the backplane board shown in FIG. 5.

The electronic design details of the backplane board 210 is shown in FIG. 7. The power supply, battery 110, is connected to power conditioner 115 and power is supplied to the peripherals and driver board 240 through connection 230. Power may also be supplied through charger 112. The power supply 110 powers the peripherals and drivers located on board 240. As data is obtained, the data is sent to the microprocessor 120 through communications ports 250. The microprocessor 120 is connected to a Bluetooth transceiver 140.

Figure 8:
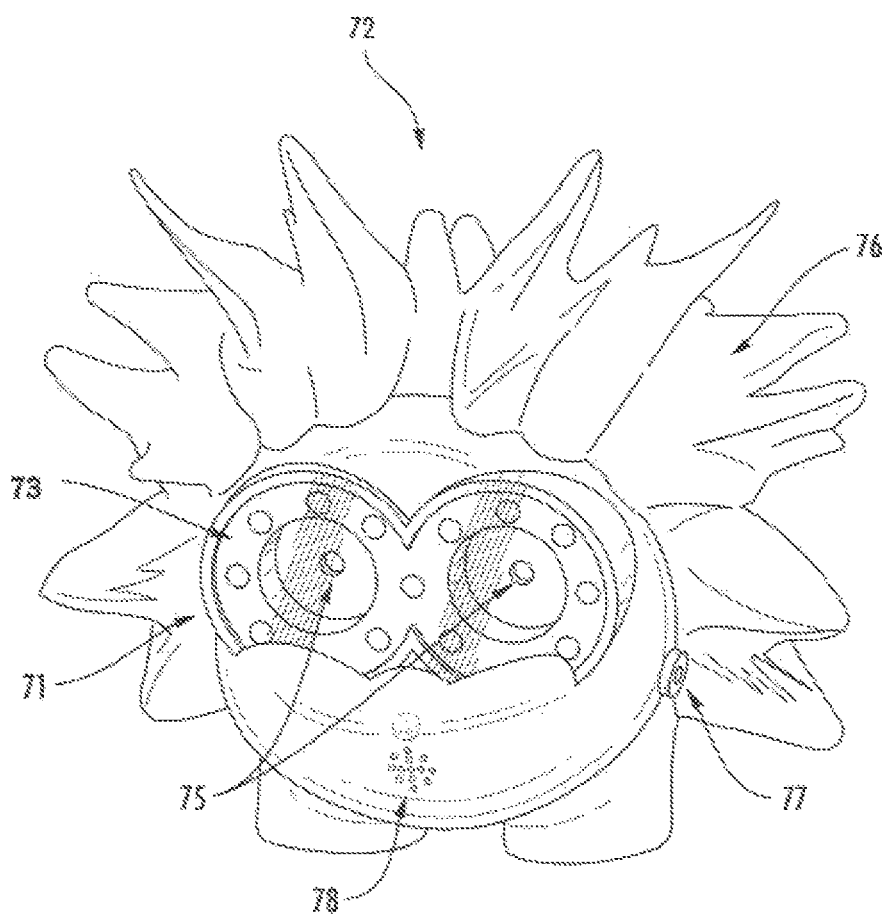
FIG. 8 is an example of an embodiment of a toy having a communicator housed within the toy.

The communicator may take many forms such as the communicator 70 or the communicator 72 shown in FIG. 1. The communicator may also be a bike, kite, or other device for kids that includes a communicator. One form of the communicator 72 is shown more specifically in FIG. 8. The communicator 72 has many child-friendly form factors. In FIG. 8 the communicator 72 is shown as having eyes 71 with centers 75. Outside of the centers 75 is a circular ring of LED lights 73 installed into the eyes 71 that are individually controlled to communicate emotions, thinking, and the like. The lights 73 can change colors and can light up in patterns. The eyes 71 can be interfaced with the different game and alarms modes that are programmed. In one embodiment the communicator 72 has silicon based hair 76 with a flex sensor, capacitive, or other type of touch sensor to determine petting, waving, compaction, or other hair interaction for use in personality behavior or game play. The communicator 72 has a button 77 to determine the play mode with the ability to switch between hosted games, such as Simon Says, Ask/Magic 8 Ball, and the like. A speaker 78 may be positioned in the communicator 72 to relay audio of many forms. Some of those audio files may be pre-generated audio stored on the communicator 72, on the smart device 60, or may come from the cloud 80. The communicator 72 can also have an end effector as a vibrating motor to create a force feedback response during game play or personality behavior (not shown). The communicator 72 is also powered/chargeable using a USB cable/connection. The communicator 72 may have other sensors to include accelerometers, light sensors, temp sensors, and the like to take local environmental readings to generate custom responses. The sensor data may be used at many levels to provide for customized play. It may be used locally on the communicator 72, transferred and used on the smart device 60, or transferred and used in the cloud 80, to generate interactive play experiences.

The housing for the communicator shown in FIG. 8 may be made of plastic, metal, or similar material and overmolded with a silicone-like material on the common body to seal the circuitry inside the housing. Over-molding provides a soft, durable body, and allows for custom colors and features for each modular design. The over-molded features can be changed for each base module design contemplated. The configuration of the housing of the base module may take a variety of shapes and sizes to form characters that are appealing to children. In another embodiment, the main body is vinyl and the hair is plush. Many forms and materials could be used for the present invention. Other embodiments of this invention include, for example, a vehicle or a push toy.

The communicator 70 has the ability to do speech-to-text as well as text-to-speech. So that would mean the audio chip on the communicator 70 can decode the audio file sent from the cloud and also encode speech received by the communicator's microphone from a child, encode that audio, and send it out to the cloud 80. As an example if the child says a phrase and the phrase is encoded on the communicator into an audio file which is sent out via the Bluetooth device to the smart device 60 or directly to the cloud 80 via WiFi. The data is then used by the cloud 80 where it may be routed to a friend. This this case, the audio is sent via the cloud to the friend's smart device 60 where it is then sent to the authorized friend's communicator 70 where the message is played.

Also, there is the case that the communicator can sense the presence of other Bluetooth or WiFi radios and get content pushed to them, i.e., a child is walking past a toy store with a communicator inside, the Bluetooth radio in the store may cause the child's communicator to say—"come on inside some of your friends would like to play."

By downloading new applications 61 from the cloud 80 to the smart device 60 or the communicator 74 directly, the communicator 74 can play other games such as hide and seek, Hot and Cold and the like. This is because the Bluetooth devices can do ranging with other Bluetooth devices (one example: iBeacon implementation). So the communicator would know when it was near one of the authorized radios and can speak to it based on how it is configured.

Given the ability to update the onboard features of the communicator with content and programs, a single device can take on many personalities. Variations may include but are not limited to hair color, LED eye color, interests, voice type and accent (girl, boy, surfer, cowboy, pirate), laughter style (giggle, chuckle), personality (timid, adventurous, etc), A randomly selected default set may be loaded on the toy at the factory but could be altered by the user through play with it, the application loaded on the smart device, or other inputs. With all the custom combinations and cloud based content changing based on interest, time, and location, no two devices would be exactly the same.

Figure 9:
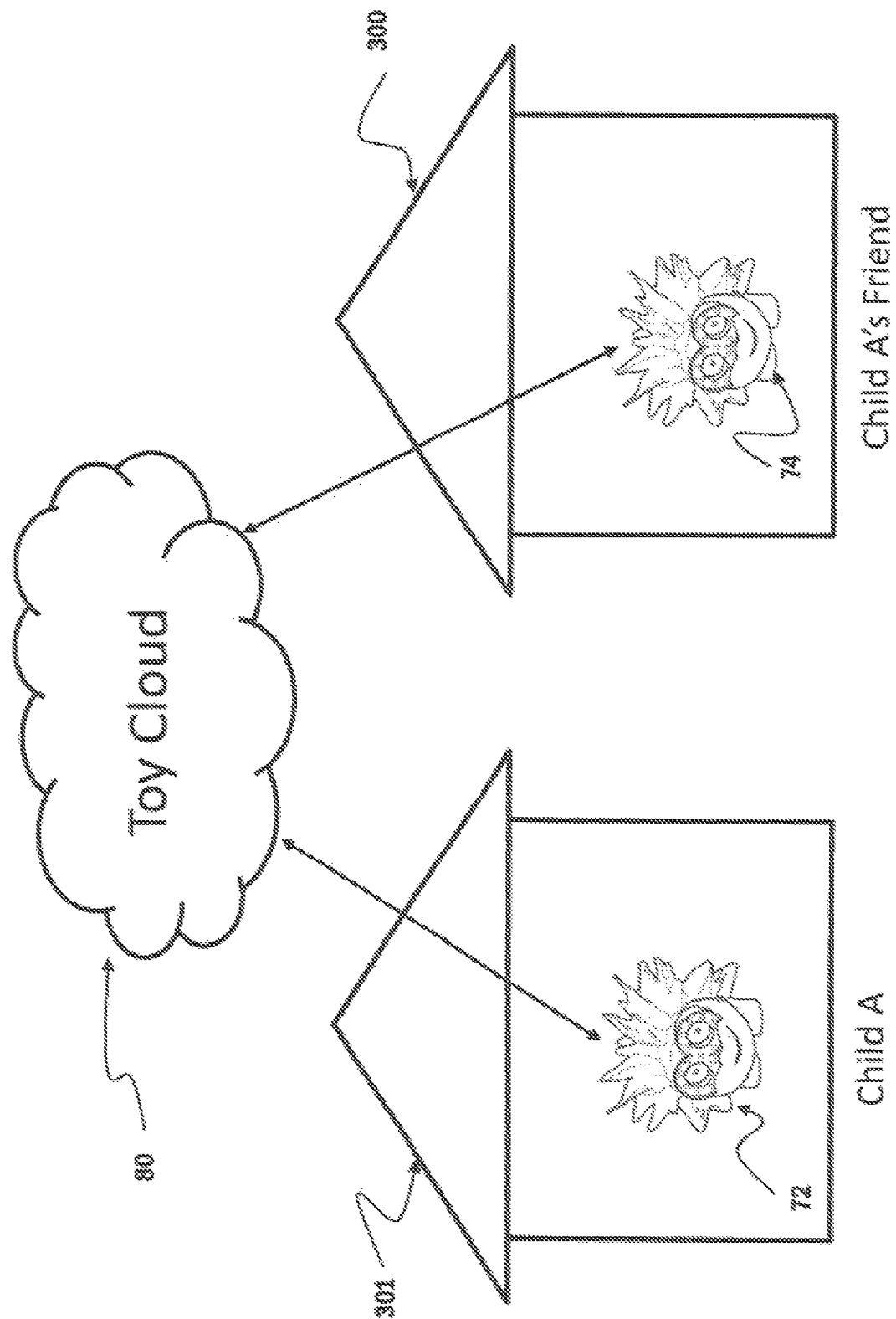
FIG. 9 illustrates a high level communication path of the electronic interactive cloud-based toy of the present invention to a friend's toy.

A key feature of this invention is the social interaction of a child's toy with their friends. FIG. 9 illustrates a high level two-way communication path of child's toy to a friend's toy. A first child's (Child A) communicator 72 has a communication path from that child's location or house 301 to the toy cloud 80 where it is then routed to Child A's friend's communicator 74 at the friend's house 300. The communication path is used to send encrypted data to support collaborative play experiences between the friends.

Figure 10:
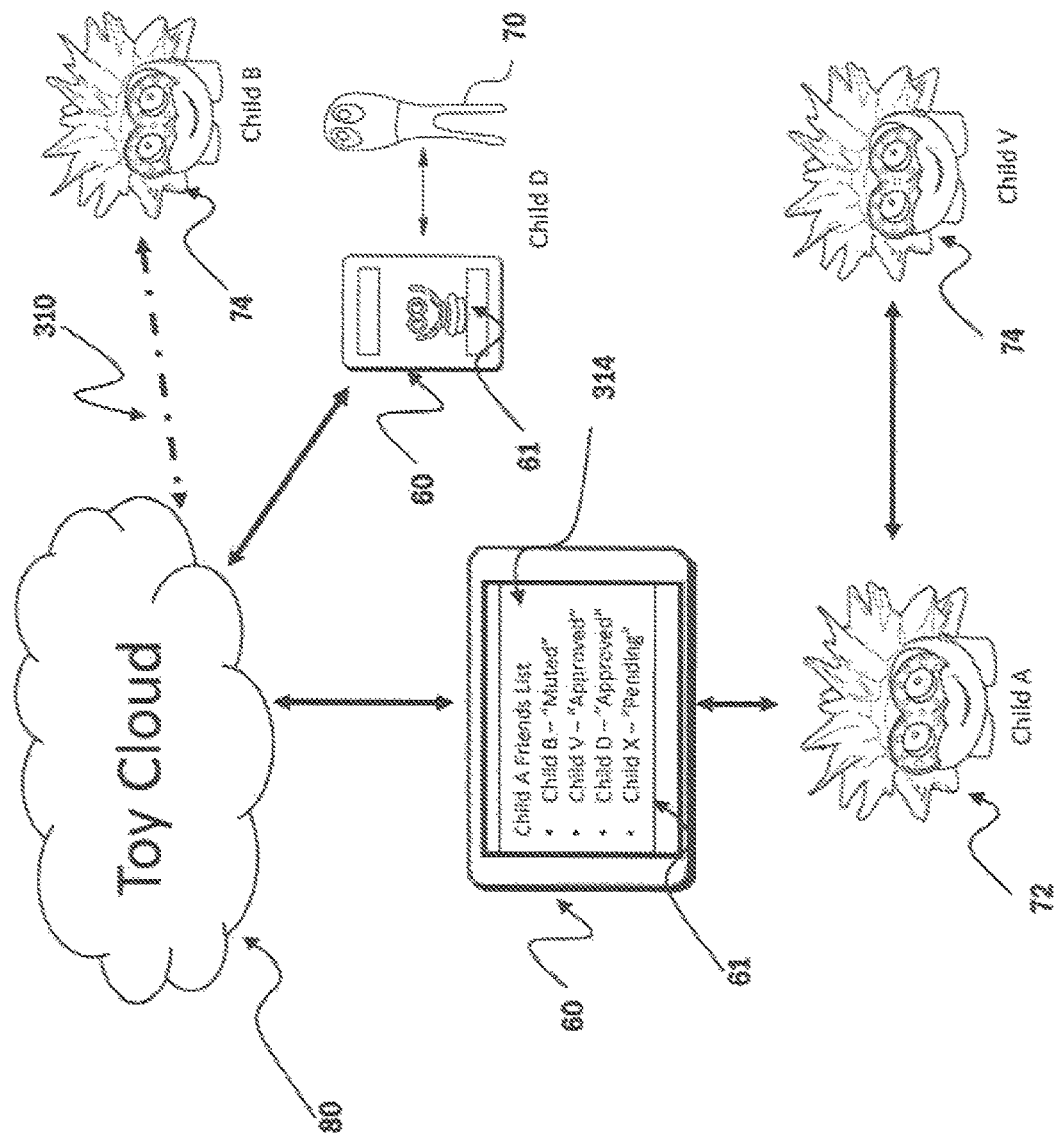
FIG. 10 illustrates another example of the present invention's communication path for a child's communicator to collaboratively link with a friend's communicator based on friends list permissions.

The toy cloud 80 of FIG. 10 includes friends list 314 for each child's user profile 20. Privacy and security are of the utmost importance with children so communicator control applications 61 on a smart device 60, uses the parent approved friends list 314 downloaded from the toy cloud 80 user profile 20 to provide authorization provisions 82 for the friend-linking of multiple communicators 70, 74, and 72 between friends. More specifically, Child A can view their parent approved friends list 314 on a smart device 60 application. The friends list 314 displays that Child A is allowed to link her communicator 72 to Child V and Child D. Child X was requested by the child and a notification was sent to the parent 400 for approval but this is still a pending friend request 317 (see FIG. 14). Communicator 72 and applications 61 for Child A will not be able to connect with Child X until both this child's parent and the Child X parent approve the friend link request 317. Child B is a parent-approved friend of Child A, however, the parent has "muted" 430 (see FIG. 15) this child as a digital timeout so this communication link 310 is temporarily disabled. While the child can request a friend, they cannot unmute a friend that parent has muted 310 unless the parent 400 gives them permission to do so. Using the friends list 314, Child A can now link her communicator 72 to the toy cloud 80 and play interactive games with Child D's communicator 70 and Child V's communicator 74.

The secure friend-to-friend communicator 70, 72, and 74 communication could happen in a number of ways. As depicted in FIG. 10, Child V's communicator 74 is using a friends list 314 that has been downloaded previously from the cloud 80 and stored on board. This friends list 314 knows the device ID's for each of the friend's toys it is allowed to communicate with and this allows the communicator 74 to talk directly to communicator 72 without routing for authentication and authorization 82 from cloud 80. Communicator 74 of Child B is not authorized at the moment to communicate with Child A because the parent permissions tables in the child's user profile 20 associated with the friends list 314 have temporarily muted 430 or disallowed this communication path 310. Child D's communicator 70 is communicating to Child A's communicator 72 using a communication path of talking to the smart device 60 through the toy cloud 80 and then to the Child A's smart device 60 and finally to the Child A communicator 72. A communicator 70, 72, and 74 could also be a smart device 60 where children can play games 61 together if they are on each other's friends list 314. Additionally, they could see where their friends place on leaderboards for games 61. Many collaborative applications or play methods could exist that would utilize the parent approved friends list 314.

Figure 11:
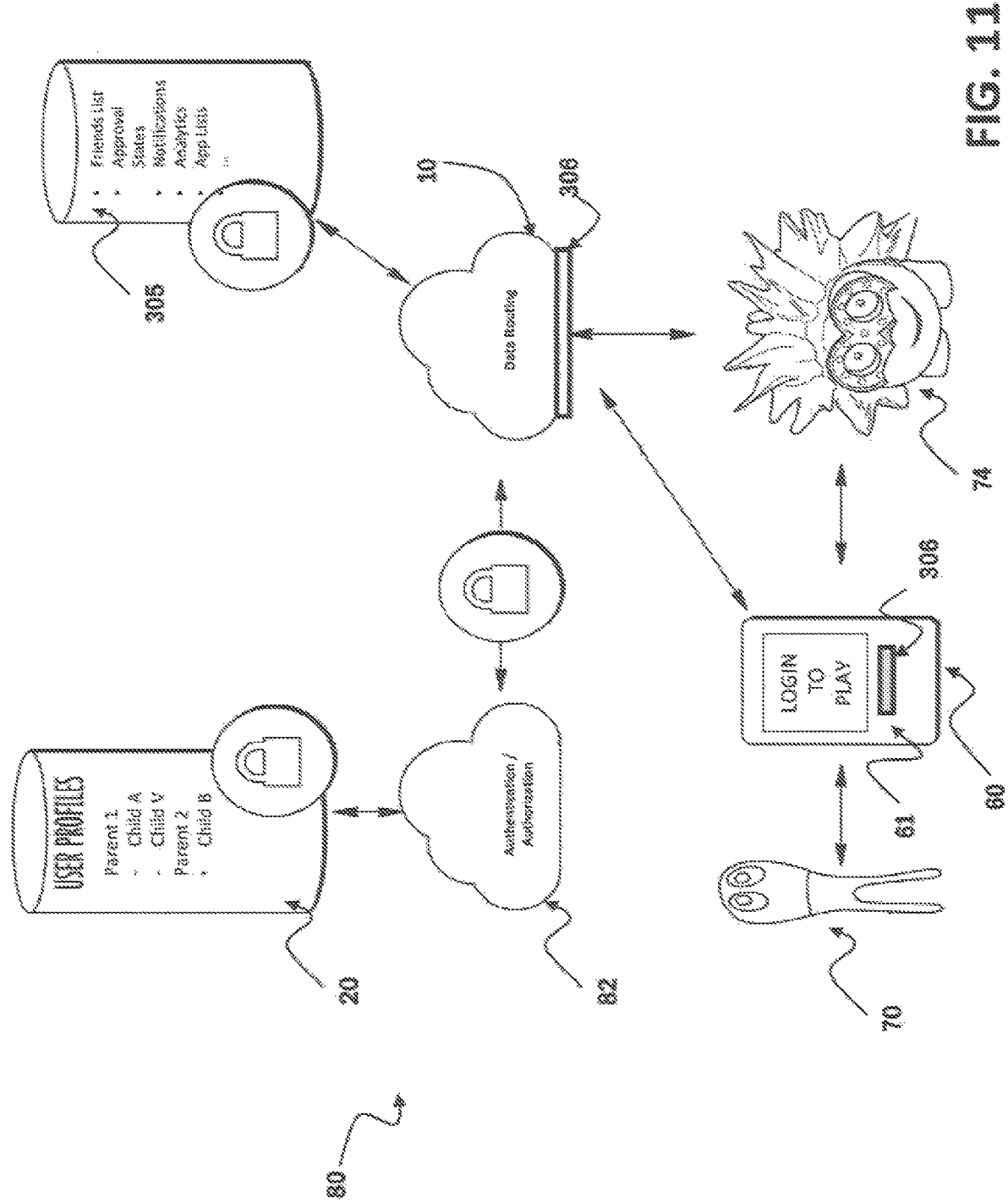
FIG. 11 depicts one embodiment of the present invention detailing how a child may authenticate their identity to register their communicator on the toy cloud.

In order to register a child's toy for play, it must be registered with the toy cloud 80. As shown in FIG. 11, toy manufacturers and app developers can install or code in a login to play button 306 that allows a child to be authenticated 82 with the toy cloud 80 to register the communicator 70 for play. A login to play button 306 has been installed into the application 61 for control of multiple communicators 70 and 74. The child uses their login credentials such as a user name and password, finger print biometrics, pin, or similar to login and authenticate 82 their identity with the toy cloud 80. The login to play button 306 is configured to send login credential commands to toy cloud 80 application program interface (API) 306. The child's login identity is routed 10, and authenticated 82 with the user profile 20. A child's friends list 314 and the parental permissions tables may be stored directly in the user profile 20 or in another secure scenario, it is stored in a separate secure database 305 that is de-identified from the personal information stored in the user profile 20. This measure can help in a data breach to keep a child's personal information safe. A communicator 70 may take the form of a cute character but could also be the smart device 60 itself. Additionally, the login to play could reside on the toy programming itself to configure the communicator 70 for play or it could be on the smart device application 61.

Figure 12:
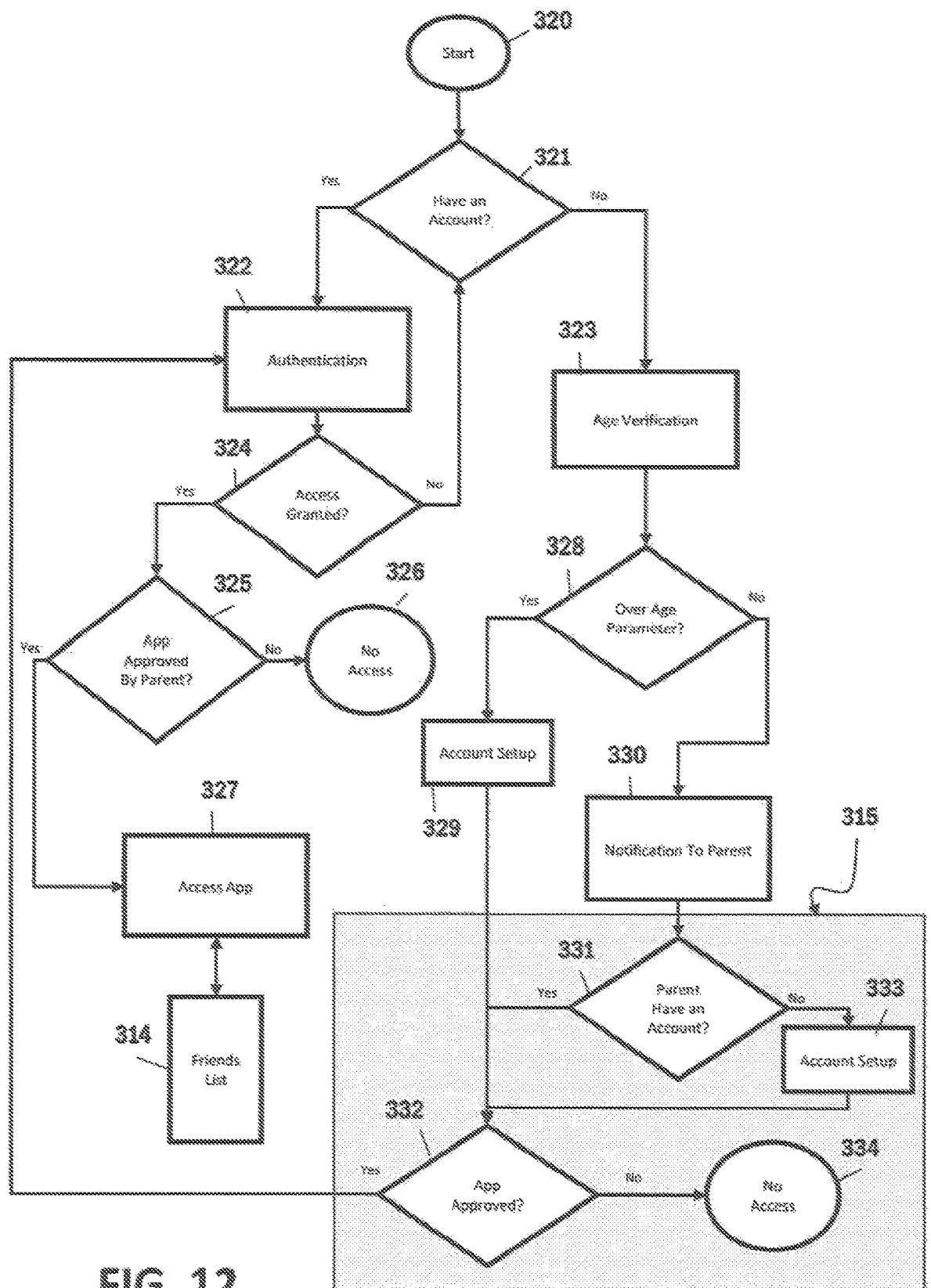
FIG. 12 is a decision tree illustrating the authentication and parent approval process for registering a child's communicator(s) with the toy cloud to include the parent's steps.

A login decision tree illustrating the authentication and parent approval process for registering a toy with the toy cloud is shown in FIG. 12. When a child turns on a communicator 70, in this embodiment, they download an application 61 to a smart device 60 to configure it for play. At the start 320, if a child does not already have an account 321 when they first begin the toy registration process, they would not be allowed to proceed to the full features of the app 61 without a toy cloud 80 account 20. The child would be prompted to provide their age 323. If their age was under a threshold 328, usually around 13 years old, they would input a parent's email, phone, or other allowed contact information for their parent 400 (FIG. 13) to accomplish setup steps 315. This would notify 330 their parents to download the parent control application 62 where they would have their identity verified 333 with a number of means, one method may be facial recognition, a government issued identification, or a credit card transaction to name a few. Once verified, they would be allowed to create a toy cloud verified parent user profile 20 and then subsequently create their children's user profiles 20. The child accounts 20 would sit below the parent 400 account 20 such that the parent could manage, monitor, and alter the child accounts 20. With child account 401 creating a child user profile 20 on the toy cloud 80, the parent would be able to review the personal information gathered, stored, and shared by the smart toy 70 (also reference FIGS. 16 and 17 for details), app 61, or game 61 on their child. After review, they would be able to provide verified consent for the privacy information of that communicator 70. The parent control application 62 would allow for the control, monitor, and management 332 of all their children's interactive toys 70, apps 61, or games 61 associated with the toy cloud 80. Toys and associated apps may come from multiple toy manufacturers on the toy cloud 80 platform and the parent control app 61 can manage all of them in a single place. Once the toy is approved by the parent 332, the child could resume setup of the toy 321 using the login credentials to authenticate 322 their child account their parent 400 created them in step 333. When the child's toy cloud profile 20 is successfully authenticated 322 with the toy cloud 80 and the toy is successfully registered with the child's account 20, the communicator 70 can now be friend-linked. The control application 61 would request the friend's list 314 and parent permissions tables 305 from the toy cloud 80 for that user profile 20, thus allowing the communicator 70 assigned to the same user profile 20 and its control application 61 to only connect with the child's friends on the friend list 314 who are parent approved and not muted 430.

The login to play button 306 is installed by the toy manufacturer in the toy control application 61 to allow only parent-approved friends to chat in the app 61 or send messages using the communicator to only their parent approved friends 314. Since the communicator 70, can access the friends list 314, it can make comments relevant to how a child's friends are playing in the control app 61—"Johnny is winning the race. Sally is in second." A leaderboard of just the parent approved friends 314 can be displayed. Parents may also set permissions for each app 61 differently. One toy app 61 may allow the child to play with anyone under age 8, while another app may only use her approved friends list 314.

Another embodiment of the present invention is to use the parent approved friends list to know when a friend's communicator 74 is nearby. The control application 61 may have logic of IF <action> THEN <response> to program the communicator 72 to respond when a child's friend is near. IF <Sally is nearby> THEN <VIBRATE>. The communicator 72 would be scanning for any friend's communicators 74 in range, and if they found them, they would then make the programmed response.

Figure 13:
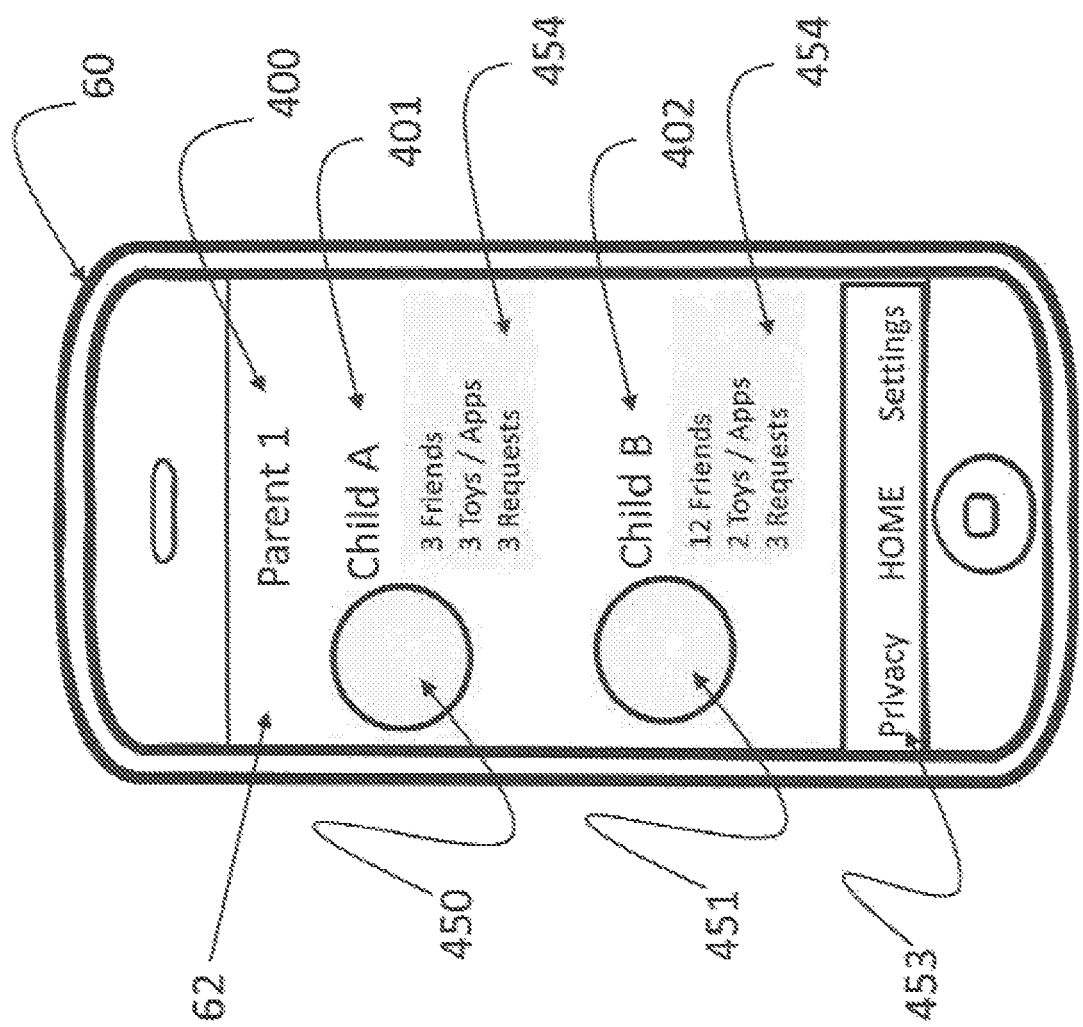
FIG. 13 is an embodiment of the present invention's parent control application home screen to add and manage a child on the toy cloud user profile.

The parent 400 uses a control application 62 on a smart device 60 to configure their toy cloud profile 20. An embodiment of the parent control application home screen is shown in FIG. 13 which shows one embodiment of how a parent 400 would manage their child profiles 20 on the toy cloud 80. The parent's first child 401 has a picture 450 and toy cloud 80 stats 454. In this instance the parent 400 has two children 401 and 402 that they are managing toy/app and friend lists on the toy cloud 80. The parent uses a menu bar 453 to navigate and view the privacy information, profile settings, and main screen functions. Child B 402 has a picture 451 and their stats 454 show there are twelve parent-approved friends, two apps and toys approved, and three pending requests for approval.

Figure 14:
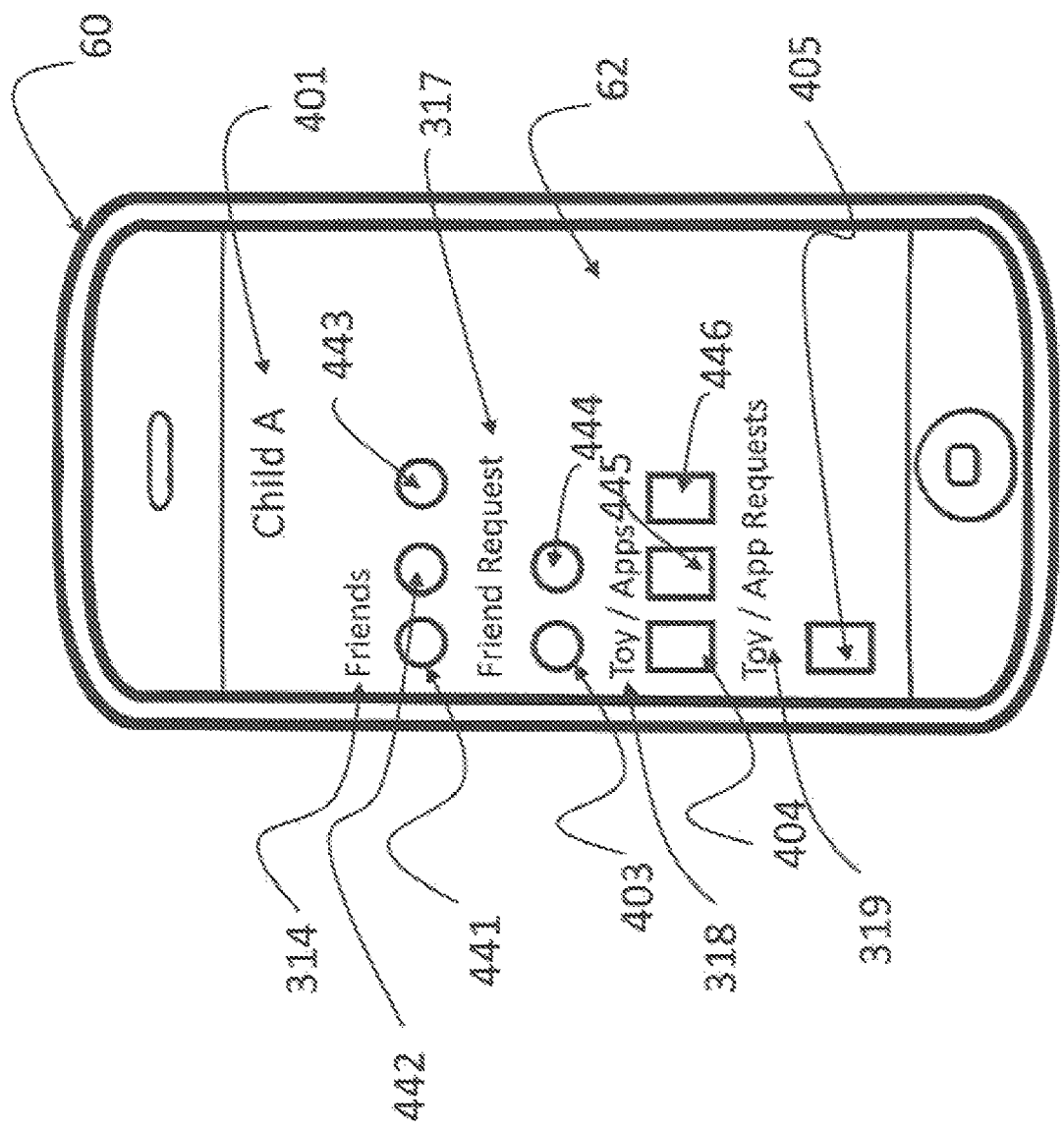
FIG. 14 is an embodiment of the present invention's parent control application to manage a child's friends and toys, including incoming requests.
Figure 15:
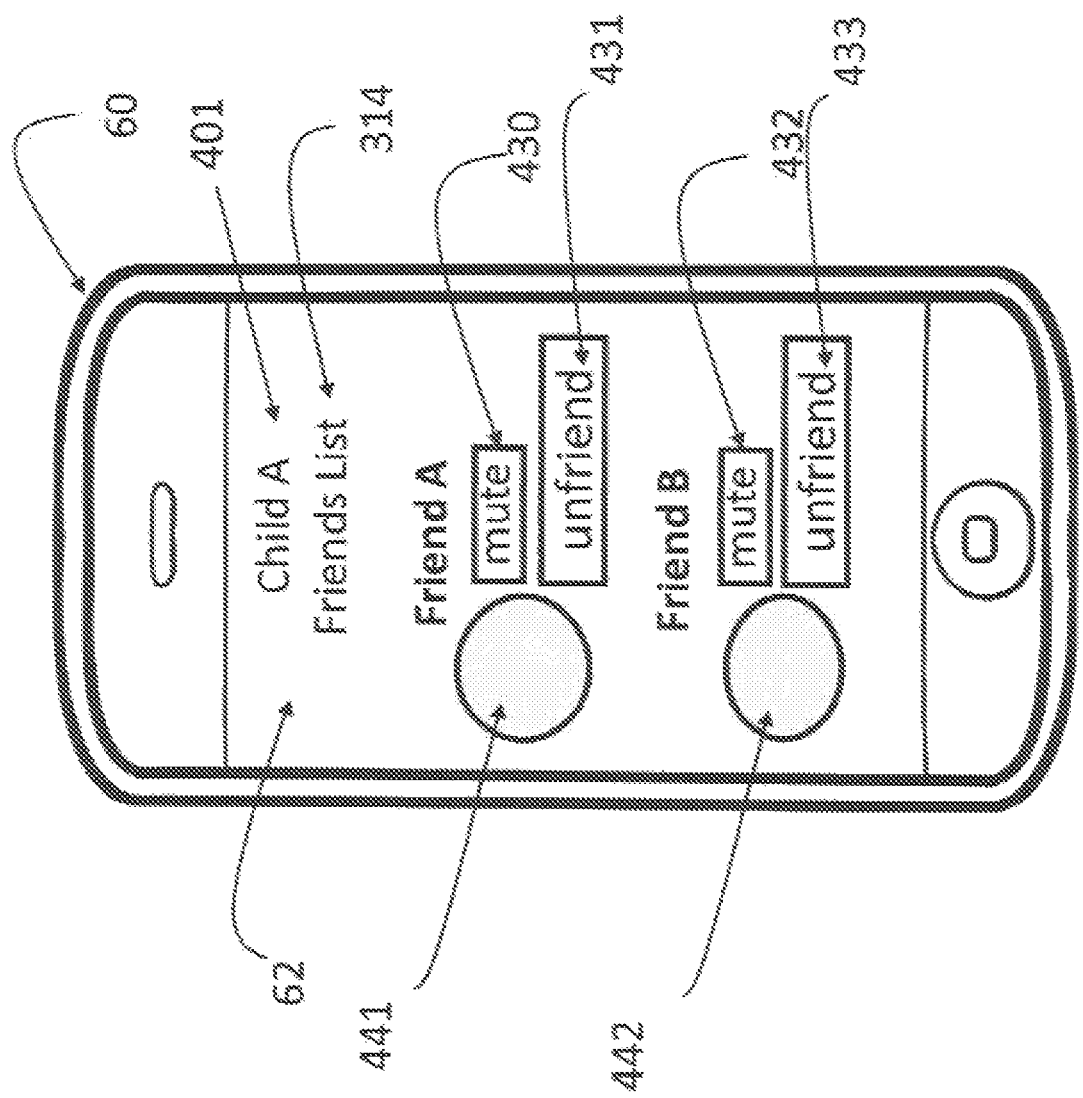
FIG. 15 is an embodiment of the present invention's parent control application friend list management screen.

The details of Child A 401 stats 454 are detailed on a subsequent screen of the parent control app 62. FIG. 14 details one embodiment of this. The parent 400 can manage the child's friends list 314 and see they have approved friends 441, 442, and 443. Currently Child A 401 has two pending friend requests 317 for friends 403 and 444. The parent has approved three communicators and their associated apps 318 for the child on the toy cloud 80. Those toy/apps include 404, 445, and 446. The child 401 has one pending communicator app 61 request 405 that must be approved in order for the child 401 to utilize the full features of play for that communicator 70, To manage the friend's list 314 for their child profiles 20, the parent has the ability to search the toy cloud friends database 305 and select friends for each child. A child may also promote friends 403 and 444 for their parent 400 to approve. Once the parent 400 approves these friends 403 and 444, a notification is sent to the friend's parent 400 for approval. Once both the child's parent 400 and the friends parent 400 have approved the request, the friend 403 is added to the friends list 314 for both children user profiles 20.

Figure 16:
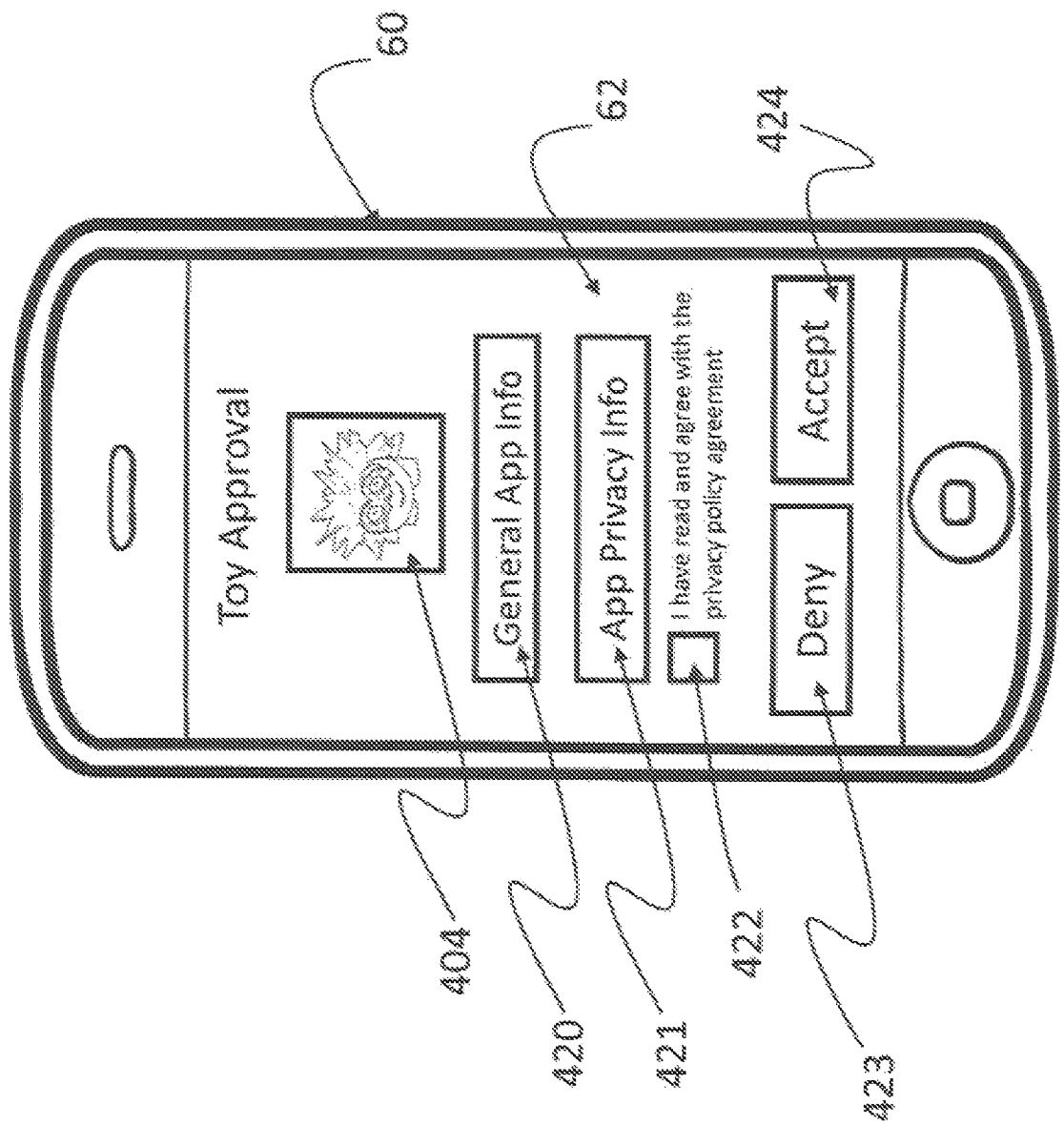
FIG. 16 is an embodiment of the parent control application toy approval screen.

Each communicator 70 a child 401 wants to play with the play features of the toy cloud 80 has to be registered with the toy cloud 80 and have its device ID assigned to the child's profile 20 in a database 315. Most toys will require verified parental consent 424 as shown in FIG. 16 because of the privacy data 421 collected, stored, and shared by the communicator 72. A communicator 72 will not fully function in this case until the parent 400 has consented to the privacy data 422 and approved 424 the communicator for use by that child. An embodiment of the parent control application toy approval screen is shown in FIG. 14. Communicator 72 app 61 must be approved by the parent 400 in the parent approval application 62. The parent 400 can view the app/toy details 420 to understand what the child 401 is doing with the toy and why privacy data and consent is needed. The parent 400 must then view the privacy information 421 for communicator 72. Once reviewing this data 421 (see FIG. 17 for more details) the parent 400 provides consent for their child 401 to play with this toy. A parent 400 may also deny consent 423 or even revoke consent at any time.

Figure 17:
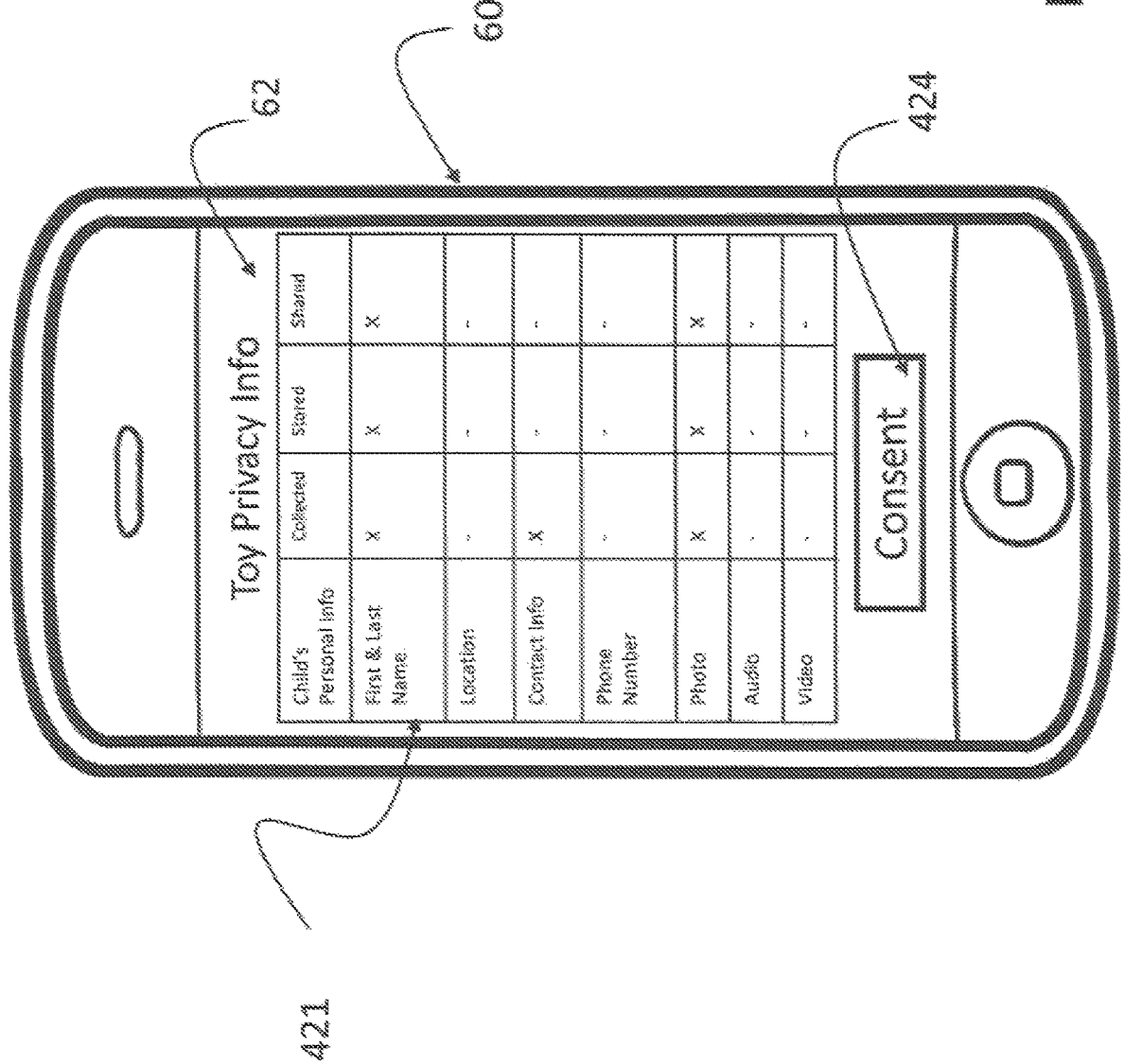
FIG. 17 is an embodiment of the parent control application toy privacy data review screen.

FIG. 17 details one embodiment of the present invention's parent control application 62 privacy data review screen where the parent 400 can see the privacy data 421 collected, stored, and shared by that communicator 72 and its associated control application 61. A parent 400 is able to approve 424 this which then allows the communicator 72 to fully function when the child 401 registers it with the toy cloud 80. The approval states are stored on the toy cloud 80 so every time a child logs in, it verifies in authentication 82 that the child 401 is still allowed to play the game. A parent 400 may temporarily mute a toy like a friends and yield it temporarily unable to synch with cloud 80 content 30 for connect play. Additionally, a parent may choose to revoke consent 424 all together and this would cause the toy cloud 80 to lock the child 401 out from playing with that communicator 72 and would make the toy manufacturer delete all personal information 421 on that child 401. If they do not approve it, the communicator 72 may only have limited play patterns. Additionally, a parent may temporarily mute the communicator 72 making it not work and they can revoke privacy consent which will force all of the child's personal data held for that application on the toy cloud 80 and the toy manufacturers servers to be permanently deleted. This will likely render the communicator 72 unusable as the child will not be able to login to that communicator 72 or its control application 62 anymore.

FIG. 18 is illustrates another use of the present invention. The toy cloud 80 includes parent 400 profiles 20 that manage their children 401, 402 user profiles 20 to set parental permissions for how the child may play with their communicators 70 and 72 and their associated applications 61. Since toys like those disclosed in the embodiments of the present invention are used for the learning of children, they have found their way into the classroom. It is therefore a requirement that a teacher 500 be able to manage the child profiles 20 on behalf of the parent 400. The system in the present invention, allows for temporary friends list 501 such as a class list. A teacher with the authority of the school, can assemble a class list 501 by searching the toy cloud 80 profile database 20 for the children 401 and add 504 them to their class list 501. The teacher 500 can then assign those children 401 and 402 to a temporary class list 501 which is similar to a friends list 314 except that this list 501 is temporary and can be deleted when the school semester or class is over. The teacher 500 views and approves the personal information 421 for the communicator 70 and provides consent 424. Any communicator the teacher 500 approves 424 would cause a notification to be sent to the parent 400. Parents 400 ultimately could revoke consent if they do not agree with the teacher providing consent for their child 401 to use a communicator 70 or its associated app 61 in the classroom. The class list 501 would allow the communicators to be used together by all the kids in the teacher's 500 class. Many types of temporary lists could exist to create a group of children to engage together all while the parent 400 can monitor and ultimately manage their child's 401 based on the permission tables set in the toy cloud 80. There may be an entire list for the school kids 401 managed by the principal 500, sports team players 401 managed by a coach 500, etc.

Many modifications and other embodiments of the invention set forth herein will come to mind to one skilled in the art to which these inventions pertain having the benefit of the teachings presented in the foregoing descriptions. Therefore, it is to be understood that the inventions are not to be limited to the specific embodiments disclosed and that modifications and other embodiments are intended to be included within the scope of the appended claims. Although specific terms are employed herein, they are used in a generic and descriptive senses only and not for the purposes of limitation.

What is claimed is:

1. An interactive toy system comprising:
at least one child communicator in the form of a toy, the toy comprising a vehicle or figurine, having electronic circuitry located therein, the electronic circuitry comprising a microprocessor having memory capability and being operably connected to a wireless transmitter/receiver configured to receive commands therefrom and transmit data thereto;
a cloud server being configured to dynamically control one or more functions of the at least one child communicator via one or more authorization provisions for a parent user profile and at least one child user profile such that the parent user profile can view and control the at least one child user profile, the at least one child user profile being associated with the at least one child communicator, the one or more authorization provisions being configured to enable the parent user profile to selectively approve and restrict content, and approve and restrict friend associations with the at least one child user profile to establish one or more secure friend associations with the at least one child user profile, the cloud server being operably connected to the at least one child communicator via an Internet connection and configured to communicate approved content and friend communications to the at least one child communicator according to the one or more authorization provisions for the at least one child user profile;
at least one friend communicator in the form of a toy, the toy comprising a vehicle or figurine, having electronic circuitry located therein, the electronic circuitry comprising a microprocessor having memory capability and being operably connected to a wireless transmitter/receiver configured to receive commands therefrom and transmit data thereto, the at least one friend communicator being communicably connected to the at least one child communicator via the cloud server, the cloud server being further configured to dynamically control one or more functions of at least one friend user profile operably associated with the at least one friend communicator via one or more authorization provisions for a friend user profile; and,
a parent control application residing on a non-transitory computer-readable medium of a parent smart device and being executed by a processor of the parent smart device, the parent smart device being operably connected to the cloud server via an Internet connection, wherein the parent control application comprises one or more authorization provisions operable to enable the parent user profile to manage permissions for the at least one child user profile to restrict content and selectively establish a secure friend association between the at least one child user profile and the friend user profile, and logic to manage and display the parent user profile and the at least one child user profile, and is operable to link the parent user profile and the at least one child user profile with other user profiles to establish the secure friend association.

2. The interactive toy system of claim 1 further comprising a child play application residing on a non-transitory computer-readable medium of a child smart device and being executed by a processor of the child smart device, the child smart device being operably connected to the cloud server via an Internet connection, the child play application being configured to control communication between the at least one child communicator and the cloud server.

3. The interactive toy system of claim 2 wherein the parent control application is operable to view and control access to the child play application.

4. The interactive toy system of claim 2 wherein the child play application is further operable to receive and communicate a child mood state.

5. The interactive toy system of claim 1 wherein the at least one child communicator has a unique device identification number, the unique identification number being linked to the parent control application and being stored on the cloud server.

6. The interactive toy system of claim 1 wherein the authorization provisions of the parent control application further comprise at least one parent identity verification protocol.

7. The interactive toy system of claim 1 wherein the cloud server is further operable to maintain a database of user profiles, device identification numbers, secure friend associations, and parent permissions.

8. A secure social play system comprising:
a plurality of child communicators each in the form of a toy, the toy comprising a vehicle or figurine, having electronic circuitry located therein, the electronic circuitry comprising a microprocessor having memory capability being operably connected to a wireless transmitter/receiver configured to receive commands therefrom and transmit data thereto;
a cloud server being configured to dynamically control one or more functions of the plurality of child communicators via one or more authorization provisions for a parent user profile and a child user profile such that the parent user profile can view and dynamically control the child user profile, the child user profile being associated with at least one child communicator in the plurality of child communicators, the one or more authorization provisions being configured to enable the parent user profile to selectively approve and restrict content, and approve and restrict friend associations with the child user profile to establish one or more secure friend associations with the child user profile, the cloud server being communicably engaged with the plurality of child communicators via an Internet connection and configured to communicate approved content and friend communications to the at least one child communicator according to the one or more authorization provisions for the at least one child user profile;
a child play application residing on a non-transitory computer-readable medium of a child smart device and being executed by a processor of the child smart device, the child smart device being communicably connected to the cloud server via an Internet connection, the child play application having one or more authorization protocols operable to connect the child user profile to the at least one child communicator in the plurality of child communicators; and,
a parent control application residing on a non-transitory computer-readable medium of a parent smart device and being executed by a processor of the parent smart device, the parent smart device being communicably connected to the cloud server via an Internet connection, wherein the parent control application comprises one or more authorization provisions operable to enable the parent user profile to manage permissions for the child user profiles and to restrict content and selectively establish a secure friend association for the child user profile, and logic to manage and display the parent user profile and the plurality of child user profiles, and is operable to link the parent user profile and the plurality of child user profiles, and is operable to link the parent user profile and the plurality of child user profiles with other user profiles to establish the secure friend association.

9. The secure social play system of claim 8 wherein each child communicator in the plurality of child communicators has a unique device identification number, the unique identification number being linked to the parent control application and the child play application, and being stored on the cloud server.

10. The secure social play system of claim 8 wherein the plurality of child communicators further comprises electronic circuitry to visually display a mood state.

11. The secure social play system of claim 8 wherein the cloud server is further operable to maintain a database of device identification numbers, secure friend associations, and parent permissions.

12. The secure social play system of claim 8 wherein the parent control application is further operable to temporarily revoke access to an authorized friend communicator.

13. The secure social play system of claim 8 wherein the parent control application is further operable to temporarily revoke access to the plurality of linked child communicators.

14. An interactive toy system comprising:
at least one child communicator in the form of a toy, the toy comprising a vehicle or figurine, having electronic circuitry located therein, the electronic circuitry comprising a microprocessor having memory capability and being operably connected to a wireless transmitter/receiver configured to receive commands therefrom and transmit data thereto;
a cloud server being configured to dynamically control one or more functions of the at least one child communicator via one or more authorization provisions for a parent user profile and the at least one child user profile such that the parent user profile can view and control the at least one child user profile, the child user profile being associated with at least one child communicator, the one or more authorization provisions being configured to enable the parent user profile to selectively approve and restrict content, and approve and restrict friend associations for the at least one child user profile to establish one or more secure friend associations with the at least one child user profile, the cloud server being operably connected to the at least one child communicator via an Internet connection, and configured to communicate approved content and friend communications to the at least one child communicator according to the one or more authorization provisions for the at least one child user profile;
at least one friend communicator in the form of a toy, the toy comprising a vehicle or figurine, having electronic circuitry located therein, the electronic circuitry comprising a microprocessor having memory capability and being operably connected to a wireless transmitter/receiver configured to receive commands therefrom and transmit data thereto, the at least one friend communicator being communicably connected to the at least one child communicator via the cloud server, the cloud server being further configured to dynamically control one or more functions of the at least one friend user profile on the at least one friend communicator via one or more authorization provisions for a friend user profile;
a parent control application residing on a non-transitory computer-readable medium of a parent smart device and being executed by a processor of the parent smart device, the parent smart device being operably connected to the cloud server via an Internet connection, wherein the parent control application comprises one or more authorization provisions operable to enable the parent user profile to manage permissions for the at least one child user profile and to selectively establish a secure friend association between the at least one child user profile and the at least one friend user profile, and logic to manage and display the parent user profile and the at least one child user profile, and is operable to link the parent user profile and the at least one child user profile with other user profiles to establish the secure friend association; and,
a child play application residing on a non-transitory computer-readable medium of a child smart device and being executed by a processor of the child smart device, the child smart device being operably connected to the cloud server via an Internet connection, the child play application having one or more authorization protocols operable to connect the at least one child user profile to one or more linked communicators.

15. The interactive toy system of claim 14 wherein the cloud server is further operable to maintain a database of device identification numbers, secure friend associations, and parent permissions.

16. The interactive toy system of claim 14 wherein the at least one child communicator has a unique device identification number, the unique identification number being linked to the parent control application and being stored on the cloud server.

* * * * *